United States Patent
Baek et al.

(10) Patent No.: US 11,012,189 B2
(45) Date of Patent: *May 18, 2021

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jongseob Baek, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,033

(22) Filed: Dec. 3, 2019

(65) Prior Publication Data

US 2020/0106556 A1 Apr. 2, 2020

Related U.S. Application Data

(63) Continuation of application No. 16/013,683, filed on Jun. 20, 2018, now Pat. No. 10,505,675, which is a (Continued)

(51) Int. Cl.
*H04L 1/00* (2006.01)
*H04L 27/26* (2006.01)
(Continued)

(52) U.S. Cl.
CPC ......... *H04L 1/0071* (2013.01); *H04B 7/0413* (2013.01); *H04L 1/0041* (2013.01);
(Continued)

(58) Field of Classification Search
None
See application file for complete search history.

(56) References Cited

U.S. PATENT DOCUMENTS 7,515,653 B2 4/2009 Lee
9,240,916 B2 1/2016 Hwang et al.
(Continued)

FOREIGN PATENT DOCUMENTS

EP 2197137 A2 6/2010
JP 63133355 A 6/1988
(Continued)

OTHER PUBLICATIONS

Digital Video Broadcasting (DVB): "Implementation guidelines for a second generation digital terrestrial television broadcasting system (DVB-T2)", ETSI TS 102 831 V1.2.1, European Telecommunications Standards Institute, Aug. 2012.
(Continued)

*Primary Examiner* — Alex Skripnikov
(74) *Attorney, Agent, or Firm* — Dentons US LLP

(57) ABSTRACT

A method and an apparatus for transmitting broadcast signals thereof are disclosed. The apparatus for receiving broadcast signals, the apparatus comprises a receiver to receive the broadcast signals, a demodulator to perform demodulation on the received broadcast signals by an OFDM (Orthogonal Frequency Division Multiplex) scheme, wherein the broadcast signals include at least one signal frame, wherein a signal frame includes a preamble and at least one sub-frame, a frequency de-interleaver to frequency de-interleave the demodulated broadcast signals by using a different interleaving sequence, wherein the different interleaving sequence is used for data at least one of the preamble and a sub-frame, wherein the different interleaving sequence is generated based on an interleaving sequence and a symbol offset, a frame parser to parse the at least one signal frame
(Continued)

from the frequency de-interleaved broadcast signals and a decoder to decode service data in the parsed at least one signal frame.

8 Claims, 46 Drawing Sheets

Related U.S. Application Data continuation of application No. 15/051,131, filed on Feb. 23, 2016, now Pat. No. 10,033,442.

(60) Provisional application No. 62/193,580, filed on Jul. 16, 2015.

(51) Int. Cl.
*H04L 29/06* (2006.01)
*H04B 7/0413* (2017.01)
*H04L 5/00* (2006.01)
*H04L 1/04* (2006.01)
*H04W 72/04* (2009.01)

(52) U.S. Cl.
CPC .......... *H04L 1/0057* (2013.01); *H04L 1/0061* (2013.01); *H04L 1/0075* (2013.01); *H04L 5/0007* (2013.01); *H04L 27/2628* (2013.01); *H04L 27/2647* (2013.01); *H04L 27/2692* (2013.01); *H04L 65/4076* (2013.01); *H04L 65/607* (2013.01); *H04L 65/80* (2013.01); *H04L 1/04* (2013.01); *H04L 27/2602* (2013.01); *H04L 27/2608* (2013.01); *H04L 2001/0093* (2013.01); *H04W 72/0446* (2013.01)

(56) References Cited

U.S. PATENT DOCUMENTS

| | | | |
|---|---|---|---|
| 9,363,026 | B2 | 6/2016 | Lambert et al. |
| 9,735,995 | B2 | 8/2017 | Baek et al. |
| 10,505,675 | B2 * | 12/2019 | Baek .................... H04B 7/0413 |
| 2009/0219918 | A1 | 9/2009 | Lee et al. |
| 2009/0296840 | A1 | 12/2009 | Atungsiri et al. |
| 2010/0246719 | A1 | 9/2010 | Ko et al. |
| 2010/0316153 | A1 | 12/2010 | Wang et al. |
| 2011/0013531 | A1 | 1/2011 | Liu |
| 2011/0286535 | A1 | 11/2011 | Ko et al. |
| 2012/0275539 | A1 | 11/2012 | Maltsev et al. |
| 2012/0327868 | A1 | 12/2012 | Taghavi et al. |
| 2013/0039397 | A1 | 2/2013 | Stadelmeier et al. |
| 2013/0322369 | A1 | 12/2013 | Park et al. |
| 2014/0161209 | A1 | 6/2014 | Limberg |
| 2014/0369364 | A1 | 12/2014 | Mouhouche et al. |
| 2015/0049828 | A1 * | 2/2015 | Baek .................... H04L 27/2627 375/267 |
| 2015/0055727 | A1 | 2/2015 | Kim et al. |
| 2015/0055728 | A1 | 2/2015 | Ko et al. |
| 2015/0146804 | A1 | 5/2015 | Baek et al. |
| 2015/0155975 | A1 | 6/2015 | Baek et al. |
| 2015/0341826 | A1 | 11/2015 | Hong et al. |
| 2016/0173233 | A1 | 6/2016 | Loghin et al. |
| 2016/0197757 | A1 | 7/2016 | Baek et al. |
| 2016/0198197 | A1 | 7/2016 | Baek et al. |
| 2016/0226687 | A1 | 8/2016 | Kim et al. |
| 2016/0234051 | A1 | 8/2016 | Baek et al. |
| 2016/0269873 | A1 | 9/2016 | Choi et al. |
| 2016/0294509 | A1 | 10/2016 | Shin et al. |
| 2016/0381516 | A1 | 12/2016 | Kim et al. |
| 2017/0019285 | A1 | 1/2017 | Baek et al. |
| 2017/0019440 | A1 | 1/2017 | Baek et al. |
| 2017/0126251 | A1 | 5/2017 | Baek et al. |
| 2017/0373905 | A1 | 12/2017 | Baek et al. |
| 2018/0026822 | A1 | 1/2018 | Kim et al. |
| 2018/0077540 | A1 | 3/2018 | Choi et al. |

FOREIGN PATENT DOCUMENTS

| | | | |
|---|---|---|---|
| JP | 2006128801 | A | 5/2006 |
| JP | 2011019231 | A | 1/2011 |
| KR | 10-2013-0122756 | A | 11/2013 |
| WO | 9407333 | A1 | 3/1994 |
| WO | 2008147053 | A1 | 12/2008 |
| WO | 2010058891 | A1 | 5/2010 |
| WO | 2010093086 | A1 | 8/2010 |
| WO | 2011/105759 | A2 | 9/2011 |
| WO | 2012171854 | A1 | 12/2012 |
| WO | 2015/072791 | A1 | 5/2015 |
| WO | 2015/076638 | A1 | 5/2015 |

OTHER PUBLICATIONS

Digital Video Broadcasting (DVB): "Next Generation broadcasting system to Handheld, physical layer specification. (DVB-NGH)", DVB Document A160, Nov. 2012.

XP017834221: "Consolidated Frequency Interleaver information for NGH," Sam Atungsiri, Sep. 19, 2011, Sony, pp. 1-8.

* cited by examiner

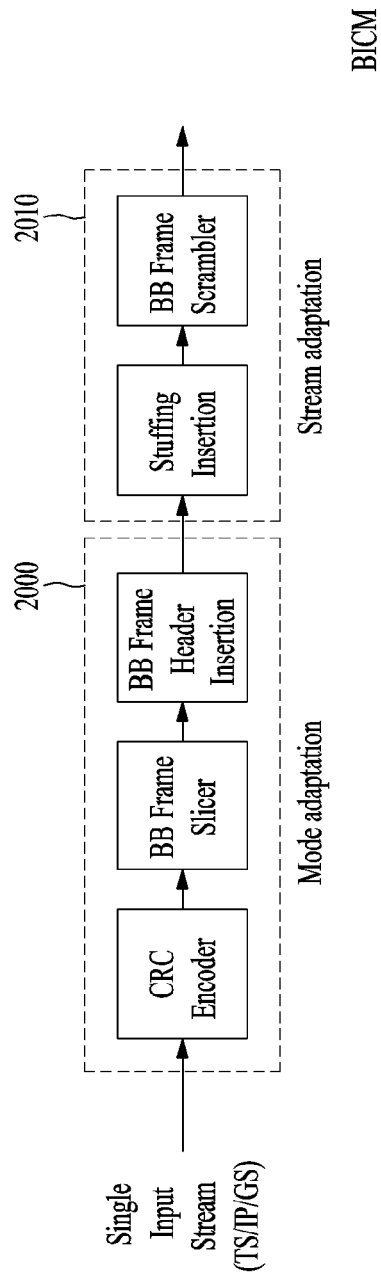
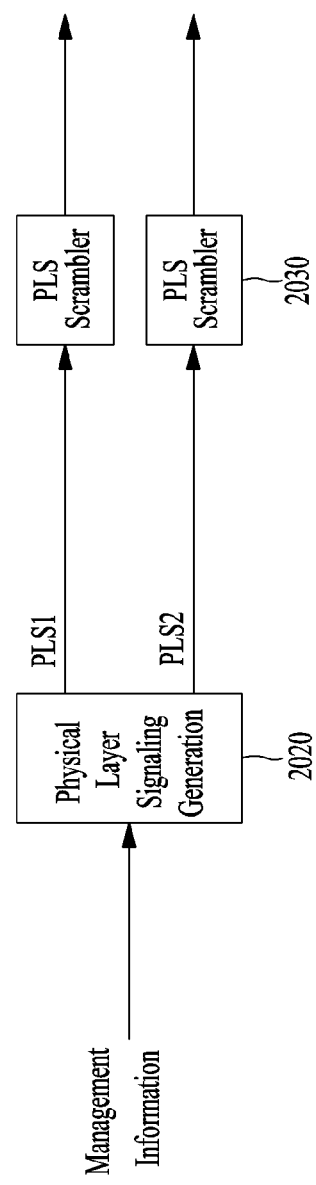
FIG. 2A
FIG. 2B

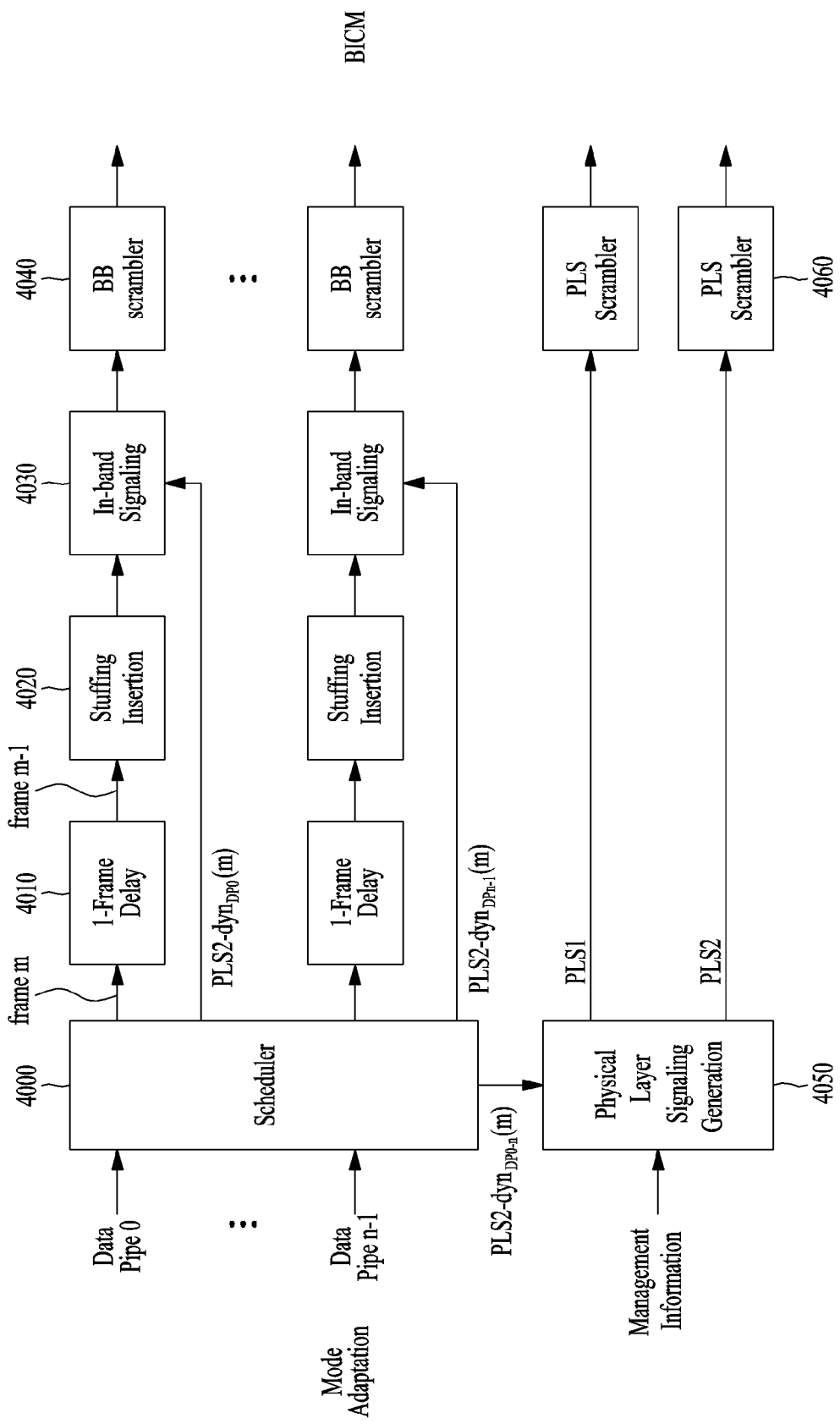

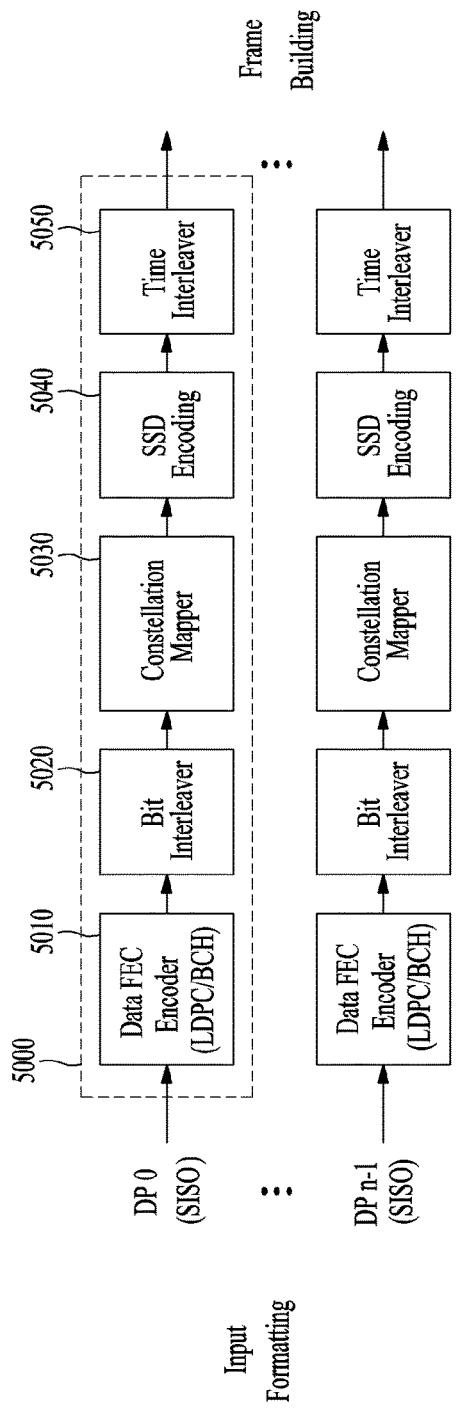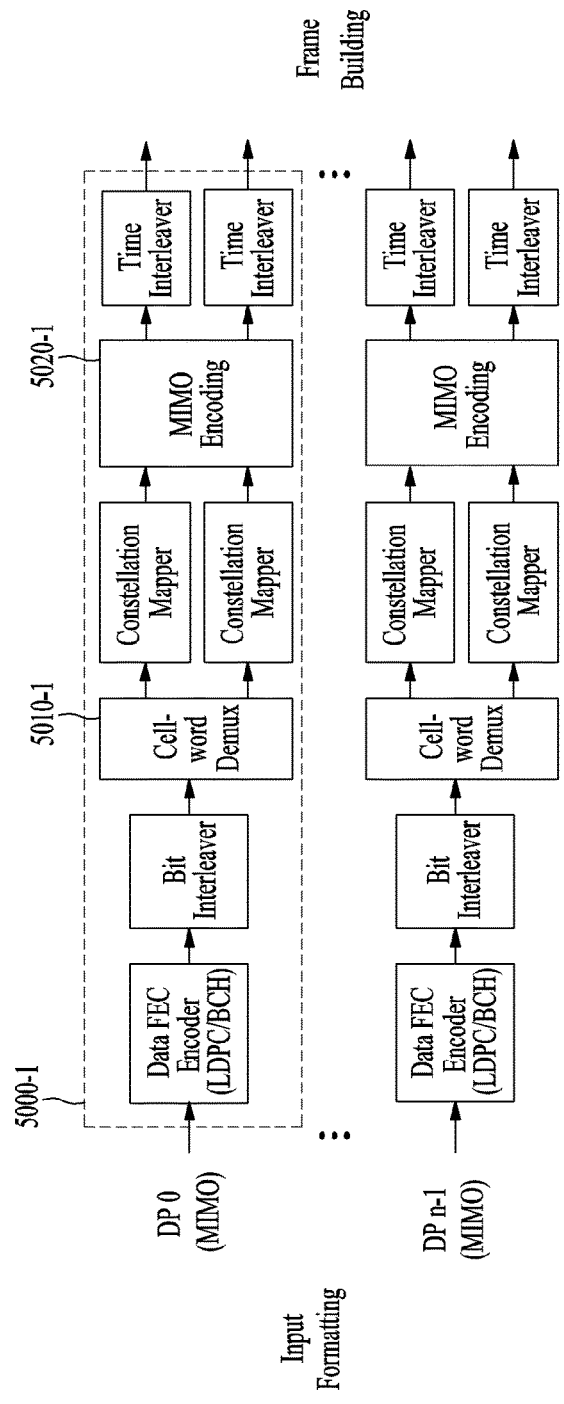

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 14

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or13) |
|     DP_NUM_BLOCK | 10 |
| end     RESERVED | 8 |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

Deinterleaving seeds corresponding to interleaving seeds

FIG. 31

○ For the first OFDM symbol, i.e., (j mod 2) = 0 of the ith OFDM symbol pair

> for $j = 0, 1, \ldots, N_{sym}$ and for $k = 0, 1, \ldots, N_{max}$,
> 
> $F_j(H_j(k)) = X_j(k)$
> 
> where $H_j(k) = (T(k) + S_{\lfloor j/2 \rfloor}) \bmod N_{max}$
> 
> $T(k)$ : is a random sequence generated by a random generator, used in the main FI
> 
> $S_{\lfloor j/2 \rfloor}$ : is a random symbol offset generated by a random symbol-offset generator, used in the jth OFDM symbol pair ○ For the second OFDM symbol, i.e., (j mod 2) = 1 of the ith OFDM symbol pair > for $j = 0, 1, \ldots, N_{sym}$ and $k = 0, 1, \ldots, N_{max}$
> 
> $F_j(k) = X_j(H_j(k))$
> 
> where $H_j(k)$ is the same random sequence used for the first symbol

FIG. 32

$A_{m,l,H(p)} = X_{m,l,p}$ for $l = 0,2,4,\ldots$
$A_{m,l,p} = X_{m,l,H(p)}$ for $l = 1,3,5,\ldots$ $A_{m,l}$: interleaved vector
$X_{m,l}$: interleaver input vector $F(p) = mod([H(p) + S(l)] / N_{max})$, where $N_{max} = 32768$ and $S(l)$ is a symbol offset

FIG. 33A $A_{m,l,H(p)} = X_{m,l,p}$ for $l = 0,2,4,\ldots$
$A_{m,l,p} = X_{m,l,H(p)}$ for $l = 1,3,5,\ldots$ $A_{m,l}$: interleaved vector
$X_{m,l}$: interleaver input vector $F(p) = mod([H(p) + S(l)] / N_{max})$, where $N_{max} = 16384$ and $S(l)$ is a symbol offset

FIG. 33B $A_{m,l,p} = X_{m,l,H(p)}$ for $l = 1,2,3,\ldots$ $A_{m,l}$: interleaved vector
$X_{m,l}$: interleaver input vector $F(p) = mod([H(p) + S(l)] / N_{max})$, where $N_{max} = 16384$ and $S(l)$ is a symbol offset

FIG. 34

$$A_{m,l,p} = X_{m,l,H(p)} \quad \text{for } l = 1,2,3,\ldots$$

$A_{m,l}$: interleaved vector
$X_{m,l}$: interleaver input vector $F(p) = \text{mod}([H(p) + S(l)] / N_{max})$, where $N_{max} = 8192$ and $S(l)$ is a symbol offset

FIG. 35

- For 32K FFT mode and 16K FFT mode

The interleaved vector $A_{m,l} = (a_{m,l,0}, a_{m,l,1}, \cdots, a_{m,l,Ndata-1})$ is defined by
$a_{m,l,H_l(p)} = x_{m,l,p}$ for even symbol of the frame ($l \bmod 2 = 0$) for $p = 0, \cdots, Ndata - 1$)
$a_{m,l,p} = x_{m,l,H_l(p)}$ for odd symbol of the frame ($l \bmod 2 = 1$) for $p = 0, \cdots, Ndata - 1$)

- For 16K FFT and 8K FFT modes

The interleaved vector $A_{m,l} = (a_{m,l,0}, a_{m,l,1}, \cdots, a_{m,l,Ndata-1})$ is defined by
$a_{m,l,p} = x_{m,l,H_l(p)}$ for even symbol of the frame ($p = 0, \cdots, Ndata - 1$)

FIG. 39A

| R' bit position | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| R bit position | 6 | 5 | 0 | 10 | 8 | 1 | 11 | 12 | 2 | 9 | 4 | 3 | 13 | 7 |

FIG. 39B

| R' bit position | 12 | 11 | 10 | 9 | 8 | 7 | 6 | 5 | 4 | 3 | 2 | 1 | 0 |
|---|---|---|---|---|---|---|---|---|---|---|---|---|---|
| R bit position | 7 | 9 | 5 | 3 | 11 | 1 | 4 | 0 | 2 | 12 | 10 | 8 | 6 |

FIG. 39C

| R' bit position | 12 | 11 | 10 | 9 | 8 | 7 | 6 | 5 | 4 | 3 | 2 | 1 | 0 |
|---|---|---|---|---|---|---|---|---|---|---|---|---|---|
| R bit position (even) | 8 | 4 | 3 | 2 | 0 | 11 | 1 | 5 | 12 | 10 | 6 | 7 | 9 |
| R bit position (odd) | 7 | 9 | 5 | 3 | 11 | 1 | 4 | 0 | 2 | 12 | 10 | 8 | 6 |

FIG. 39D

| R' bit position | 11 | 10 | 9 | 8 | 7 | 6 | 5 | 4 | 3 | 2 | 1 | 0 |
|---|---|---|---|---|---|---|---|---|---|---|---|---|
| R bit position (even) | 5 | 11 | 3 | 0 | 10 | 8 | 6 | 9 | 2 | 4 | 1 | 7 |
| R bit position (odd) | 8 | 10 | 7 | 6 | 0 | 5 | 2 | 1 | 3 | 9 | 4 | 11 |

FIG. 40

- The basic interleaving sequence generator is defined based on the $(N_r-1)$ bit binary word sequence $N_r = \log_2 N_{max}$
1. $0 \leq n < 2$
   $R'_n [N_r-2, N_r-3, \cdots, 1, 0] = [0, 0, \cdots, 0, 0]$
2. $n = 2$
   $R'_n [N_r-2, N_r-3, \cdots, 1, 0] = [0, 0, \cdots, 0, 1]$
3. $2 < n < N_{max}$
   $R'_n [N_r-3, N_r-4, \cdots, 1, 0] = R'_n [N_r-2, N_r-3, \cdots, 2, 1]$

FIG. 41

- The random symbol-offset generator is defined based on the (Nr-1) bit binary word sequence $N_r = \log_2 N_{max}$,
1. $0 \leq k < 2$
   $G_n[N_r-1, N_r-2, \cdots, 1, 0] = [1, 1, \cdots, 1, 1]$
2. $2 < k < L_F$
   $G_k[N_r-2, N_r-3, \cdots, 1, 0] = G_{k-1}[N_r-1, N_r-2, \cdots, 2, 1]$

FIG. 42

- Random address generator with the basic interleaving sequence generator and symbol-offset generator $N_r = \log_2 N_{max}$,
$p = 0$
for $(n = 0; n < N_{max}; n = n+1)$
{
  $T(n) = (n \bmod 2) 2^{N_r-1} + \sum_{i=0}^{N_r-2} 2^i R_n[i]$;
  $S_l(n) = (T(n) + A_{\lfloor l/2 \rfloor}) \bmod N_{max}$;

if $(S_l(n) < N_{max})\{$
    $H_l(p) = S_l(n); p = p+1;\}$
} where $A_{\lfloor l/2 \rfloor} = A_k$ is calculated every OFDM symbol pair for $(k = 0; k < \lfloor \frac{N_{max}}{2} \rfloor; k = k+1)$
{
  $A_k = \sum_{k=0}^{N_r-1} 2^i G_k[i]$;
}

FIG. 43

$A_{m,l,H(p)} = X_{m,l,p}$     for l = 1,2,3,....

$A_{m,l}$: interleaved vector
$X_{m,l}$: interleaver input vector $F(p) = mod([H(p) + S(l)] / N_{max})$, where $N_{max} = 16384$ and $S(l)$ is a symbol offset

FIG. 44A $A_{m,l,H(p)} = X_{m,l,p}$     for l = 0,2,4,....
$A_{m,l,p} = X_{m,l,H(p)}$     for l = 1,3,5,....

$A_{m,l}$: interleaved vector
$X_{m,l}$: interleaver input vector $F(p) = mod([H(p) + S(l)] / N_{max})$, where $N_{max} = 8192$ and $S(l)$ is a symbol offset

FIG. 44B $A_{m,l,H(p)} = X_{m,l,p}$     for l = 1,2,3,....

$A_{m,l}$: interleaved vector
$X_{m,l}$: interleaver input vector $F(p) = mod([H(p) + S(l)] / N_{max})$, where $N_{max} = 8192$ and $S(l)$ is a symbol offset The interleaved vector $A_{m,l} = (a_{m,l,0}, a_{m,l,1}, \cdots, a_{m,l,N_{data}-1})$ is defined by $a_{m,l,H_l(p)} = x_{m,l,p}$ for even symbol of the frame ($p = 0, \cdots, N_{data} - 1$)

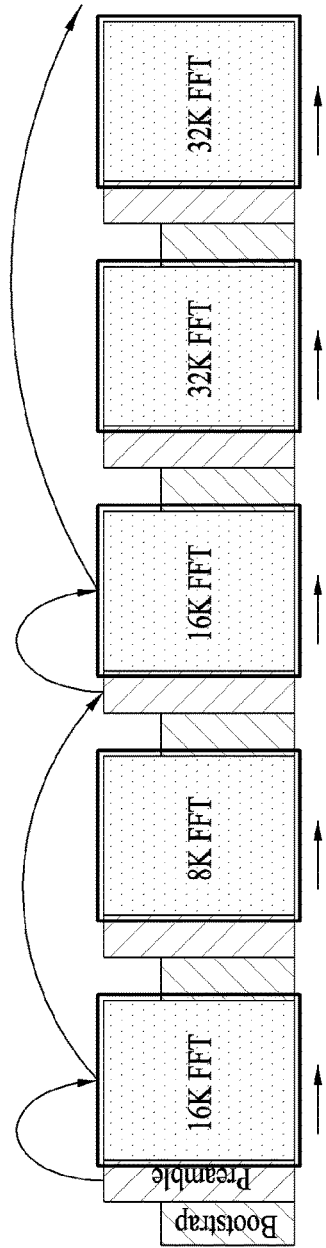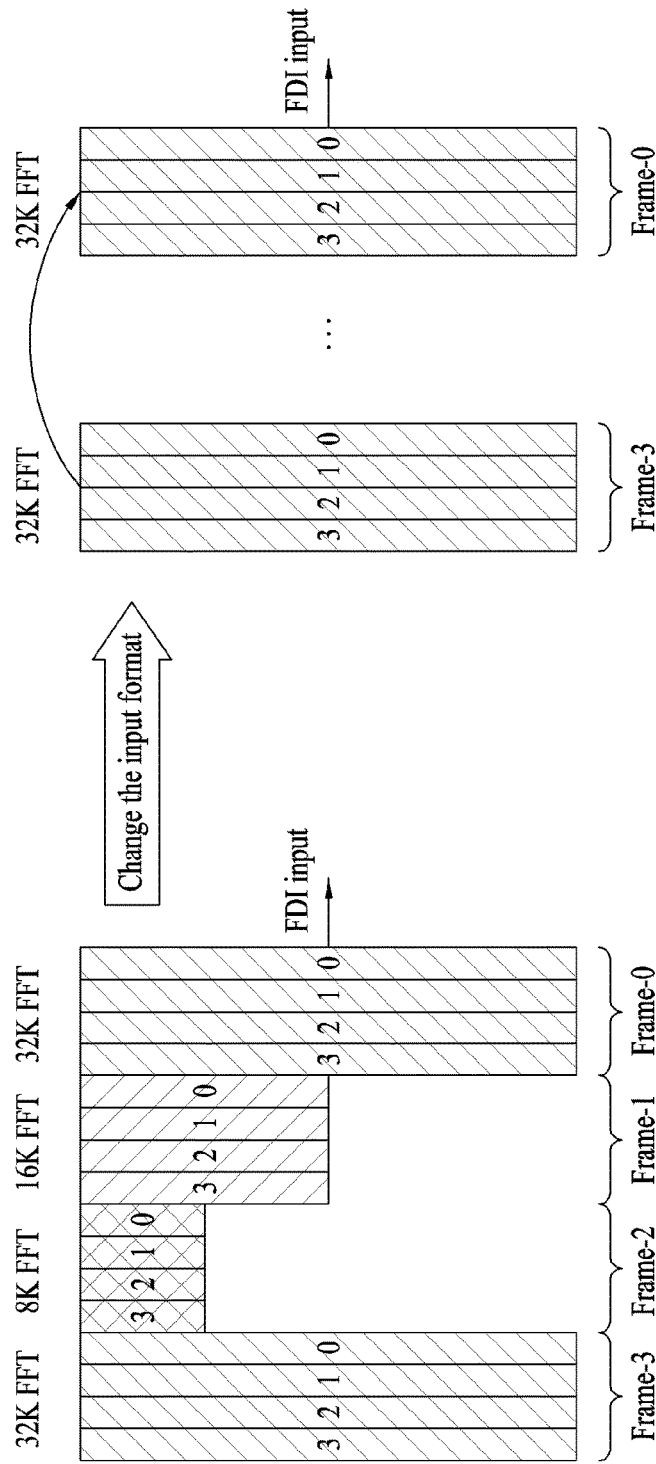
FIG. 54A
FIG. 54B

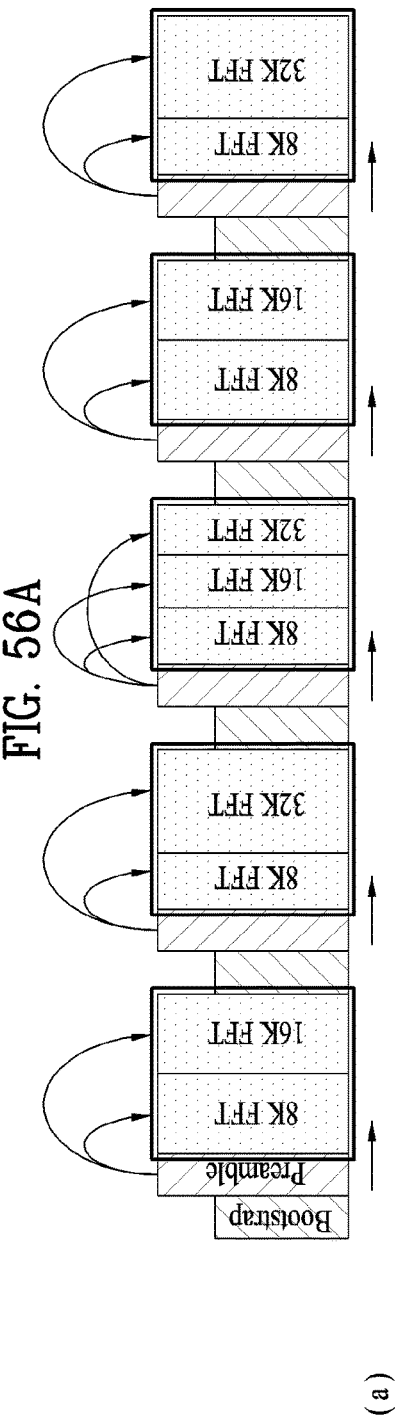
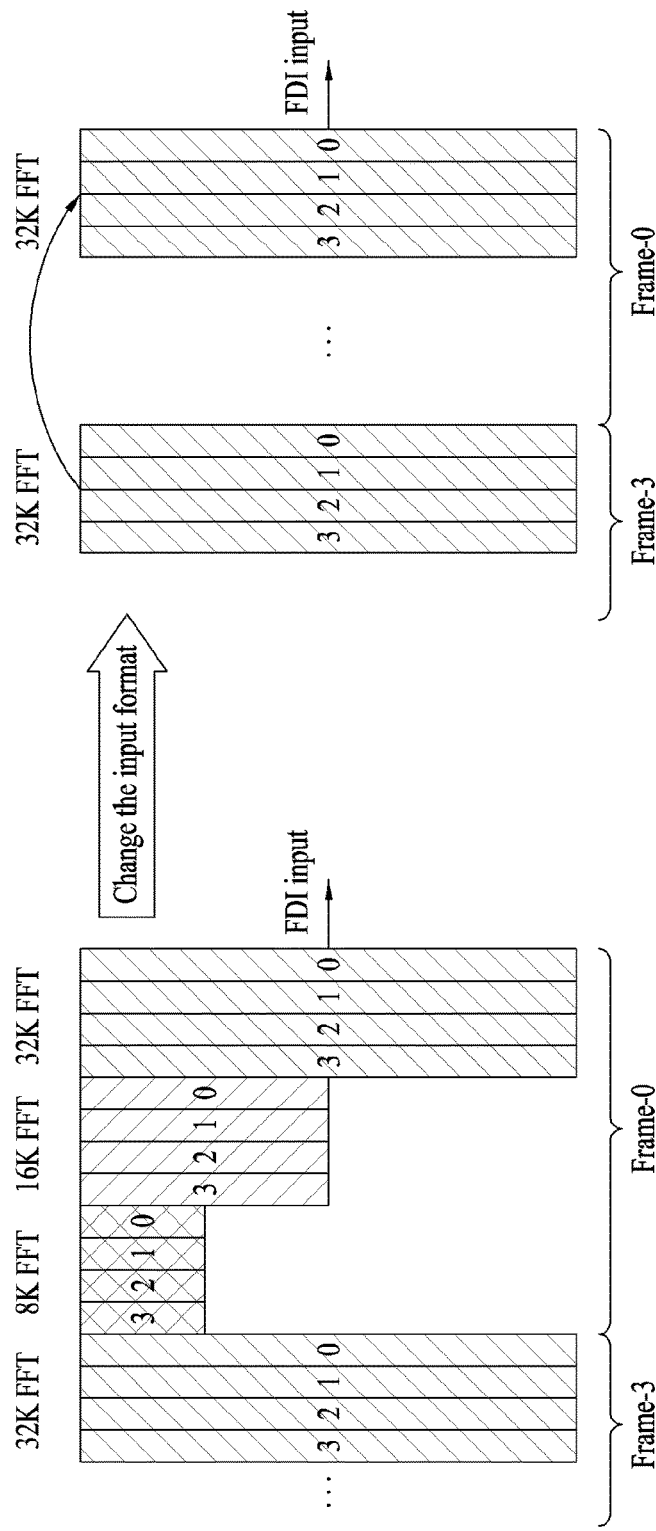
FIG. 56A
FIG. 56B

Symbol offset value is reset to an initial value

Symbol offset value is reset to an initial value

Symbol offset value is reset to an initial value

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application is a continuation of U.S. patent application Ser. No. 16/013,683 filed Jun. 20, 2018, now allowed, which is a continuation of U.S. patent application Ser. No. 15/051,131 filed Feb. 23, 2016, now issued as U.S. Pat. No. 10,033,442 on Jul. 24, 2018, which claims the benefit of U.S. Provisional Application No. 62/193,580 filed Jul. 16, 2015, which are hereby incorporated by reference in its entirety.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

To achieve the object and other advantages and in accordance with the purpose of the invention, as embodied and broadly described herein, a method for receiving broadcast signals, the method comprises receiving the broadcast signals, demodulating the received broadcast signals by an OFDM (Orthogonal Frequency Division Multiplex) scheme, wherein the broadcast signals include at least one signal frame, wherein a signal frame includes a preamble and at least one sub-frame, frequency de-interleaving the demodulated broadcast signals by using a interleaving sequence, wherein the interleaving sequence is used for data at least one of the preamble and a sub-frame, wherein the interleaving sequence is generated based on an interleaving sequence and a symbol offset, parsing the at least one signal frame from the frequency de-interleaved broadcast signals and decoding service data in the parsed at least one signal frame.

Advantageous Effects

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A-2B illustrate an input formatting block according to one embodiment of the present invention.

FIG. 4 illustrates an input formatting block according to another embodiment of the present invention.

FIGS. 5A-5B illustrate a BICM block according to an embodiment of the present invention.

FIG. 13 illustrates PLS1 data according to an embodiment of the present invention.

FIG. 14 illustrates PLS2 data according to an embodiment of the present invention.

FIG. 31 is a conceptual diagram illustrating deinterleaving of the single memory in association with data segments corresponding to the input OFDM symbols.

FIG. 32 shows equations indicating the operations of 32K FFT mode-frequency interleaver according to the embodiment.

FIGS. 33A-33B show equations indicating the operations of 16K FFT mode-frequency interleaver according to the embodiment.

FIG. 34 illustrates the equations indicating the operations of the frequency interleaver of the 8K FFT mode according to the embodiment of the present invention.

FIG. 35 illustrates the equations indicating the frequency interleaver input/output (I/O) operations according to respective FFT modes.

FIGS. 39A-39D show wire permutation tables according to one embodiment of the present invention.

FIG. 40 is the equation illustrating the operations of the basic interleaving sequence generator according to one embodiment of the present invention.

FIG. 41 is the equation illustrating the operations of the symbol offset generator according to one embodiment of the present invention.

FIG. 42 is the equation illustrating the interleaving address according to one embodiment of the present invention.

FIG. 43 is the equation indicating the operations of 16K FFT mode-frequency interleaver according to another embodiment of the present invention.

FIGS. 44A-44B present the equation illustrating the operation of the 8K FFT mode-frequency interleaver according to another embodiment of the present invention.

FIGS. 54A-54B present a conceptual diagram illustrating the method for processing signal frames of the single FFT mode by the broadcast signal reception apparatus according to another embodiment of the present invention.

FIGS. 56A-56B present a conceptual diagram illustrating a method for allowing the broadcast signal reception apparatus to process signal frames of the mixed FFT mode according to another embodiment of the present invention.

DETAILED DESCRIPTION OF THE INVENTION

Figure 1:
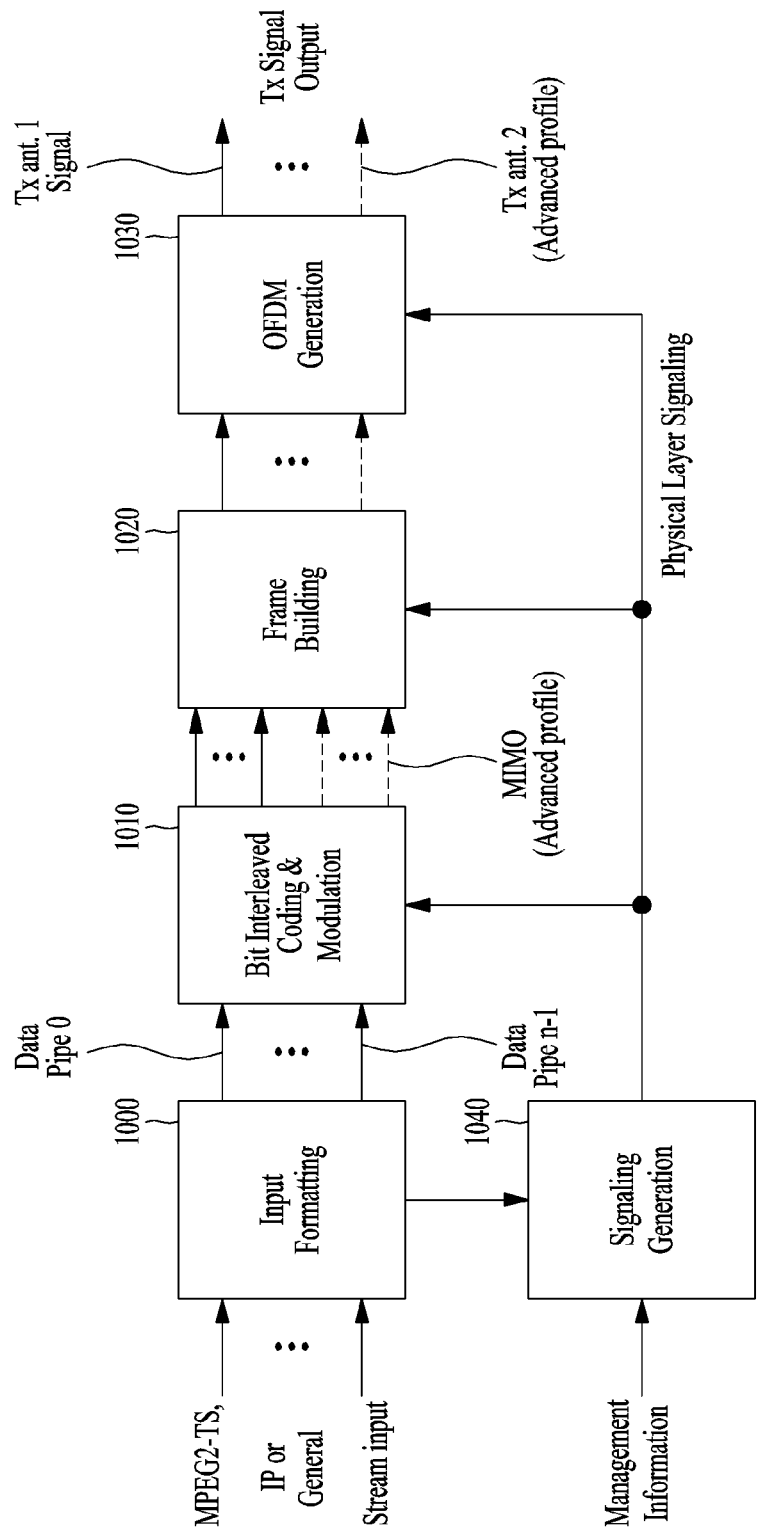
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 3:
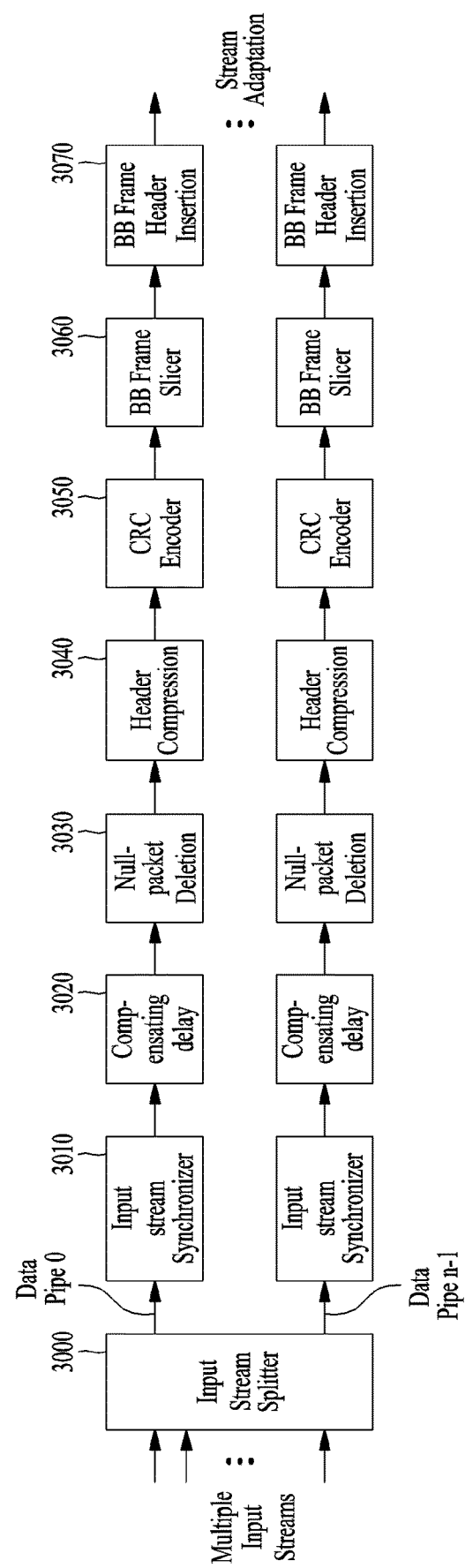
FIG. 3 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
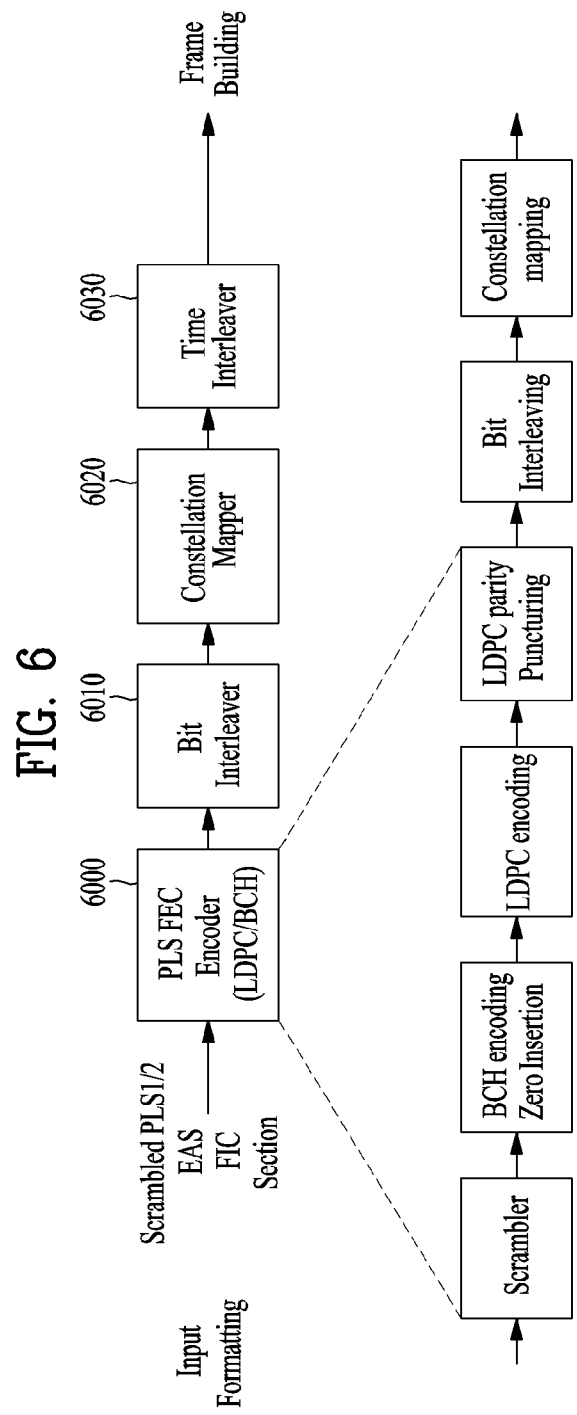
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
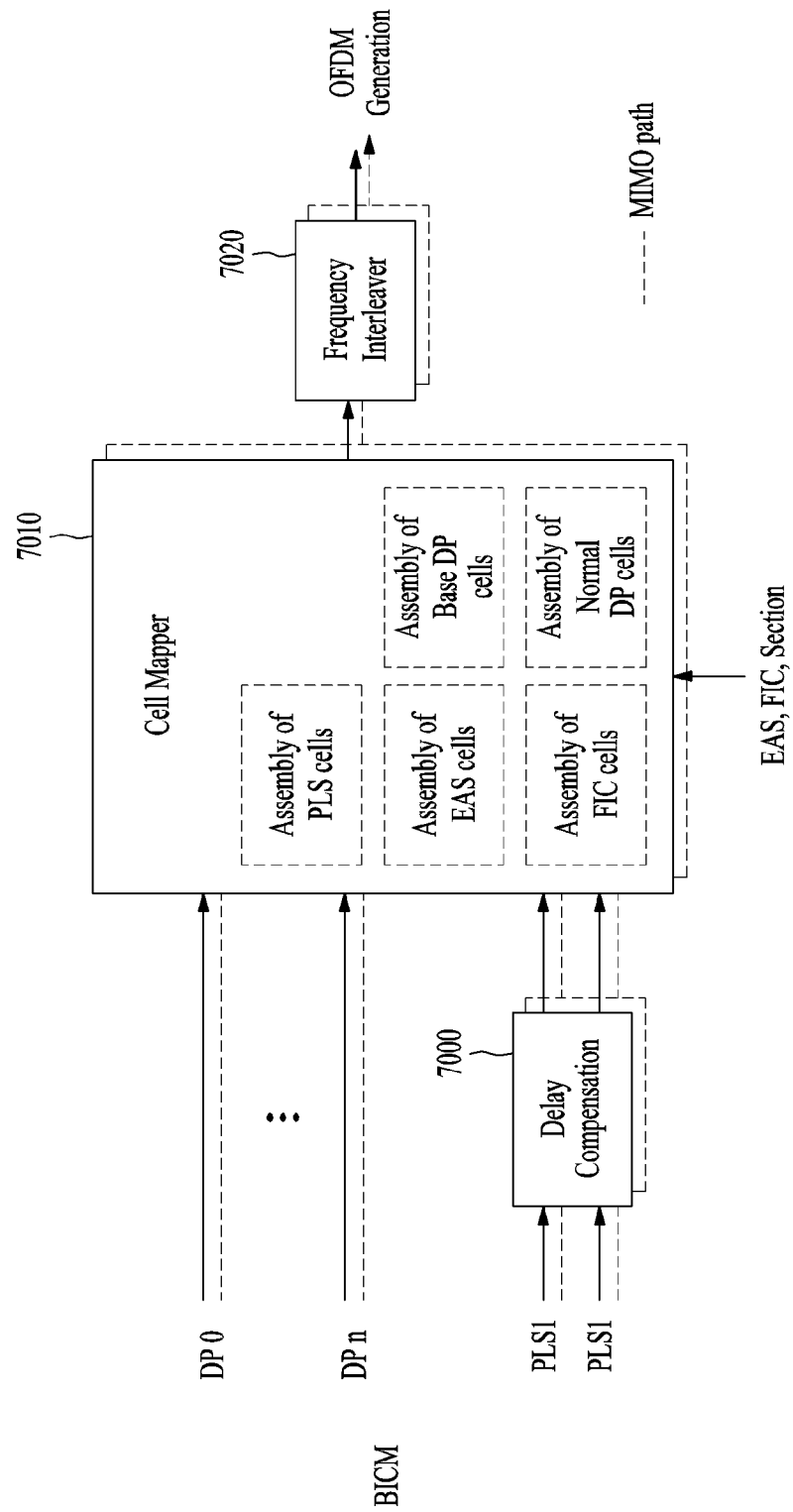
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 8:
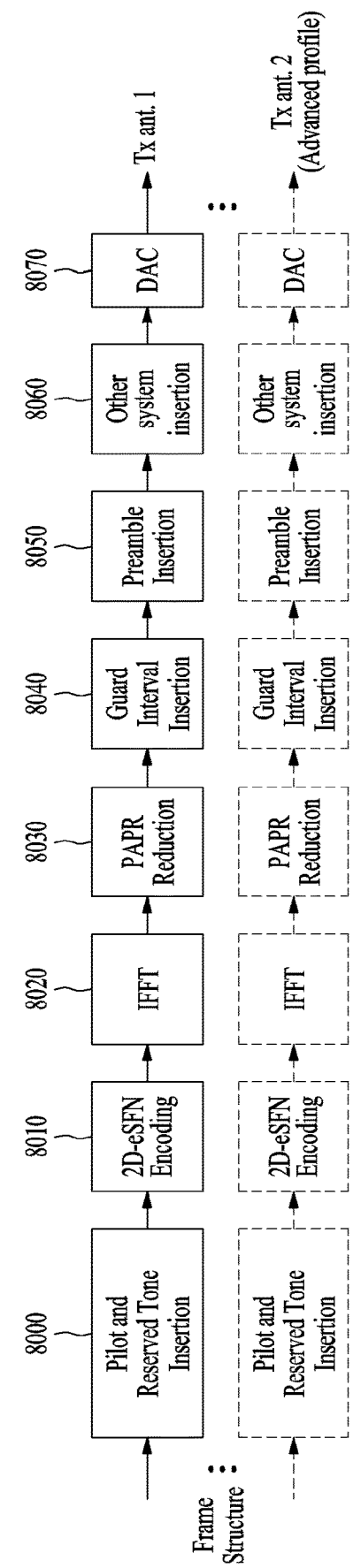
FIG. 8 illustrates an OFDM generation block according to an embodiment of the present invention.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
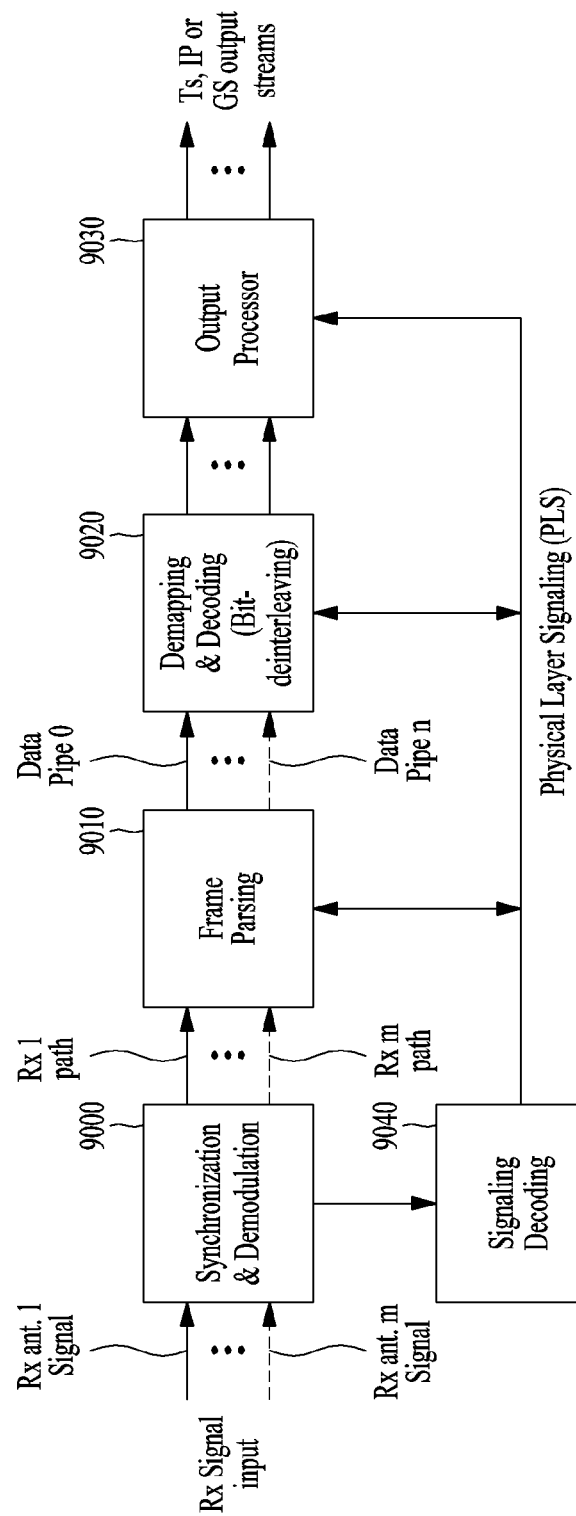
FIG. 9 illustrates a structure of an apparatus for receiving broadcast signals for future broadcast services according to an embodiment of the present invention.
Figure 10A:
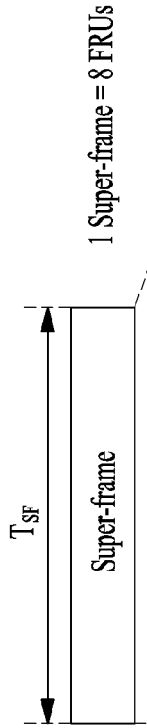
FIGS. 10A-10D illustrates a frame structure according to an embodiment of the present invention.
Figure 10B:
Figure 10C:
Figure 10D:
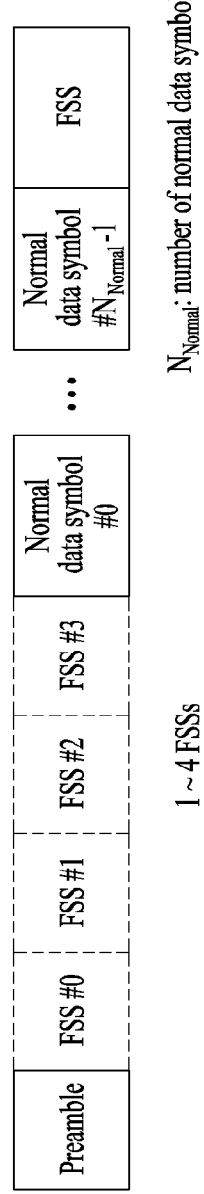

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
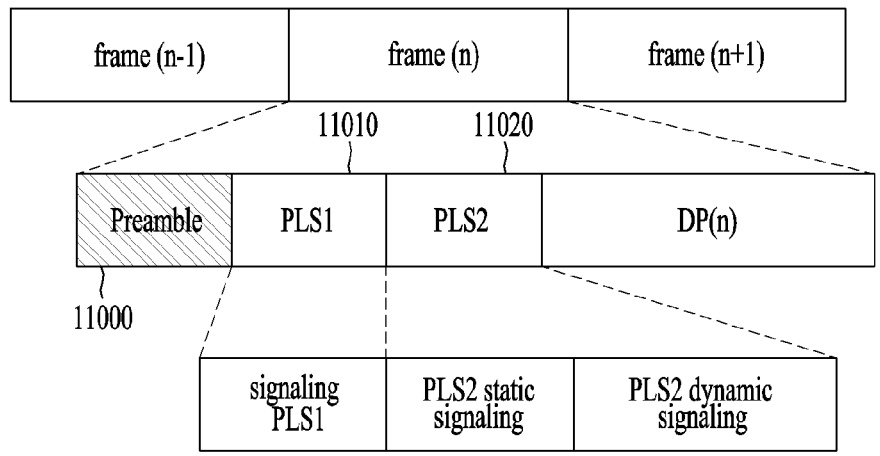
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

FFT_SIZE: This 2 bit field indicates the FFT size of the current frame within a frame-group, as described in below table 6.

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
| --- | --- |
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to 'O'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |

TABLE 16-continued

| Value | Modulation |
| --- | --- |
| 1000 | NUC-1024 |
| 1001~1111 | reserved |

DP_SSD LAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

HC_MODE_P: This 2-bit field indicates the IP header compression mode when DP_PAYLOAD_TYPE is set to IP ('01'). The HC_MODE_IP is signaled according to the below table 26.

TABLE 26

| Value | Header compression mode |
| --- | --- |
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
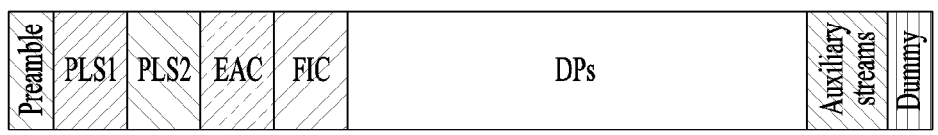
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
| --- | --- | --- |
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
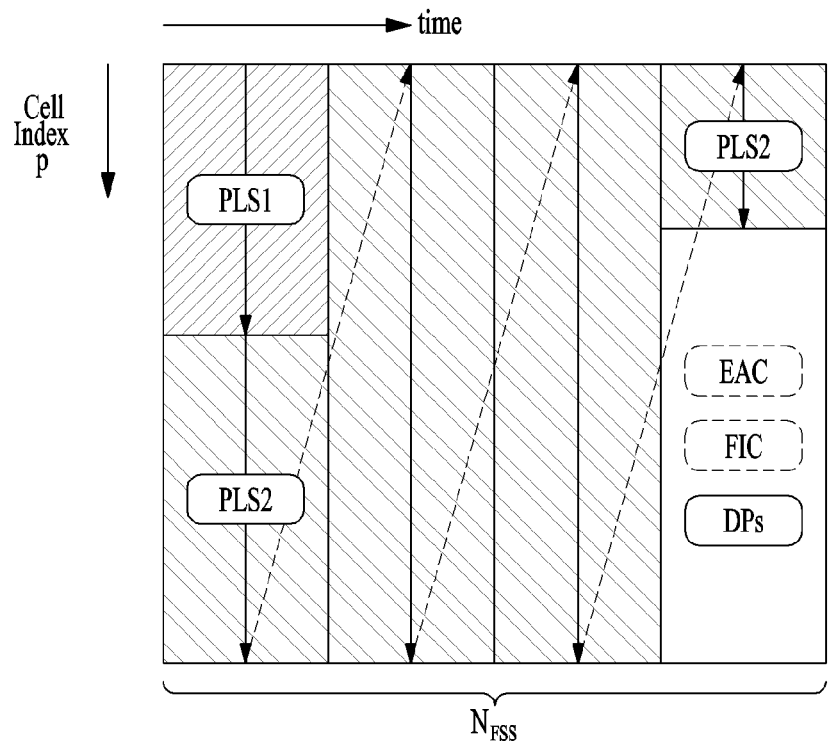
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
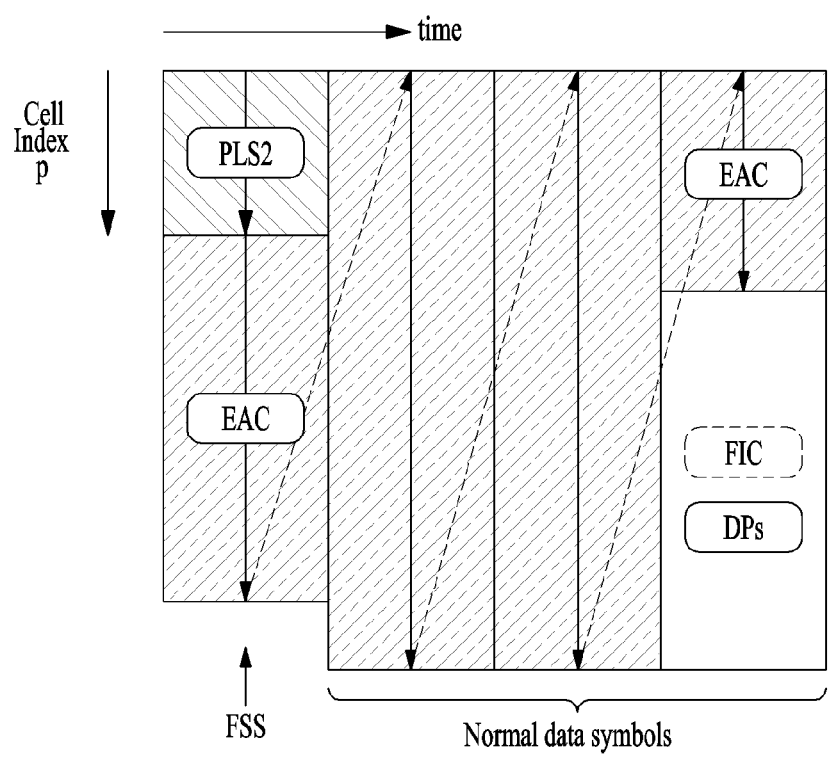
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19B:
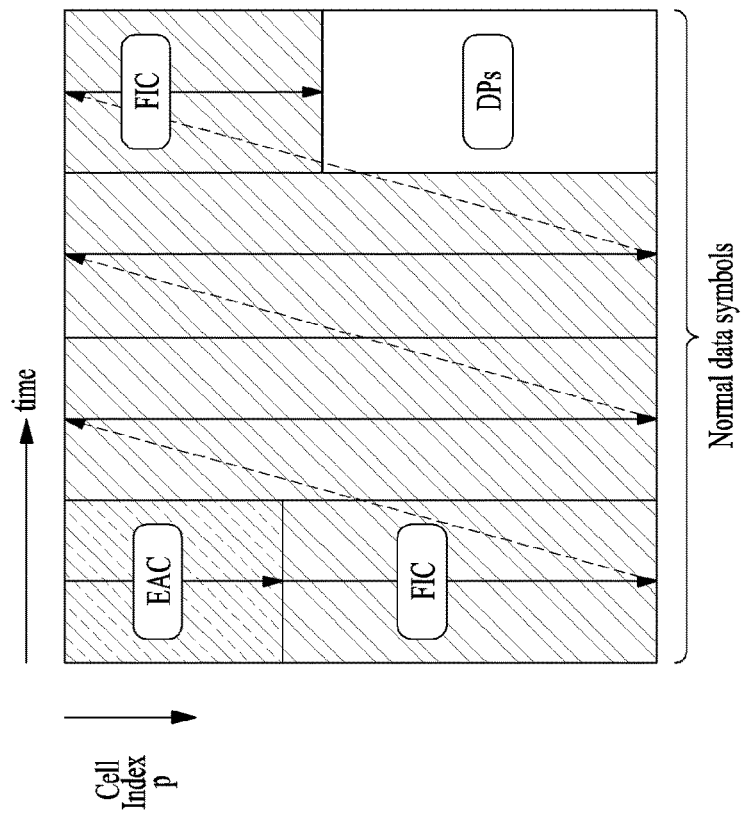
FIGS. 19A-19B illustrate FIC mapping according to an embodiment of the present invention.
Figure 19A:
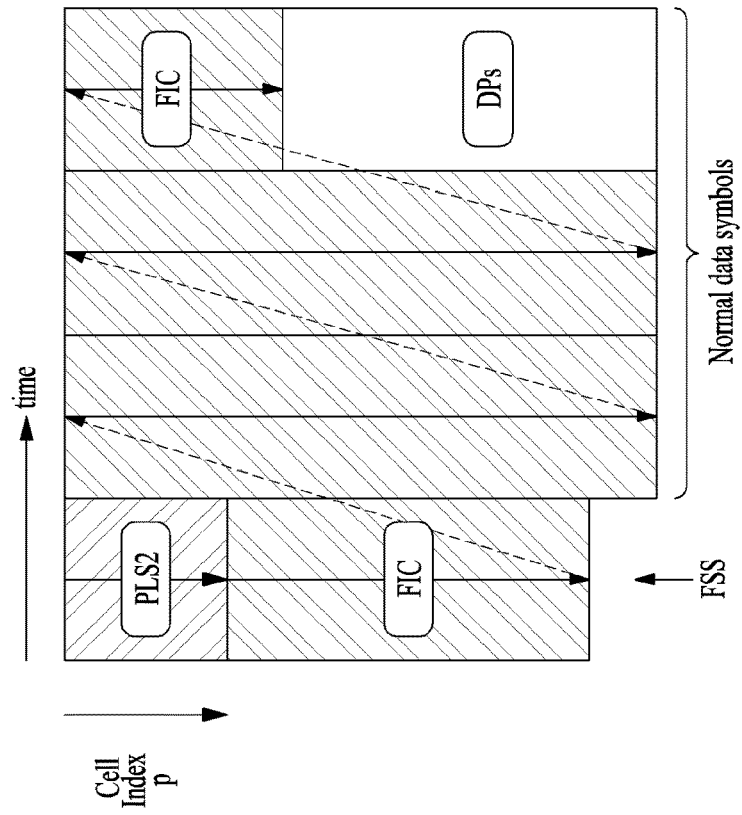

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20B:
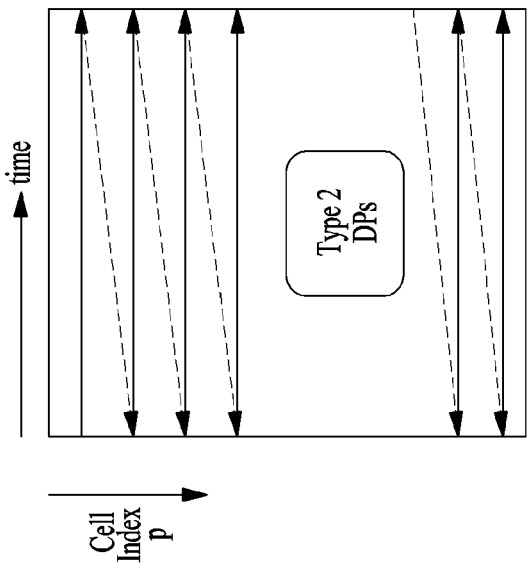
FIGS. 20A-20B illustrate a type of DP according to an embodiment of the present invention.
Figure 20A:
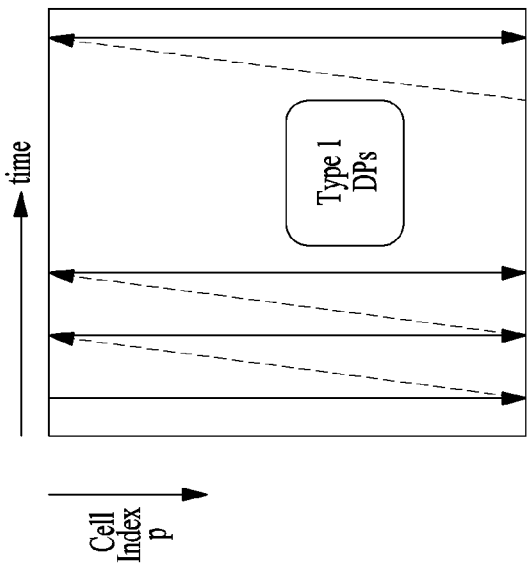

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1} + D_{DP2} \leq D_{DP}$$ [Expression 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21A:
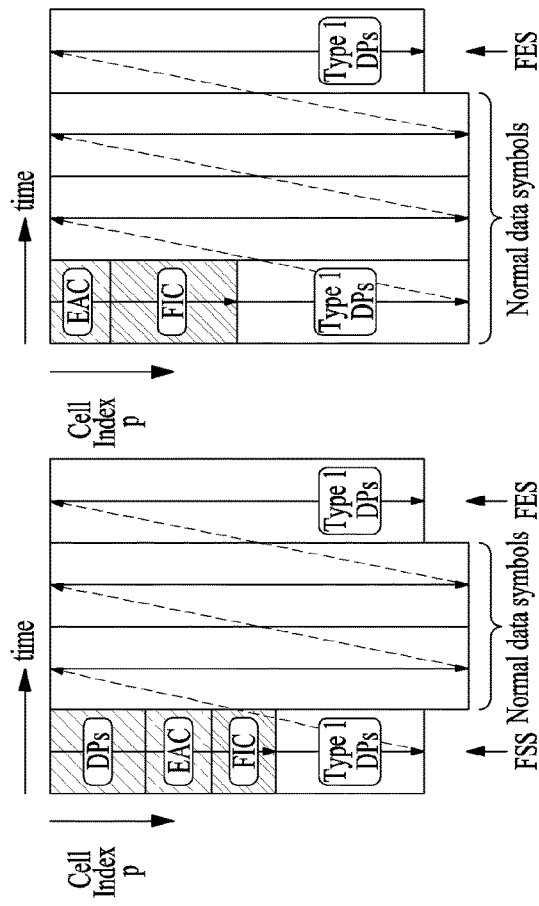
FIGS. 21A-21B illustrate DP mapping according to an embodiment of the present invention.
Figure 21B:
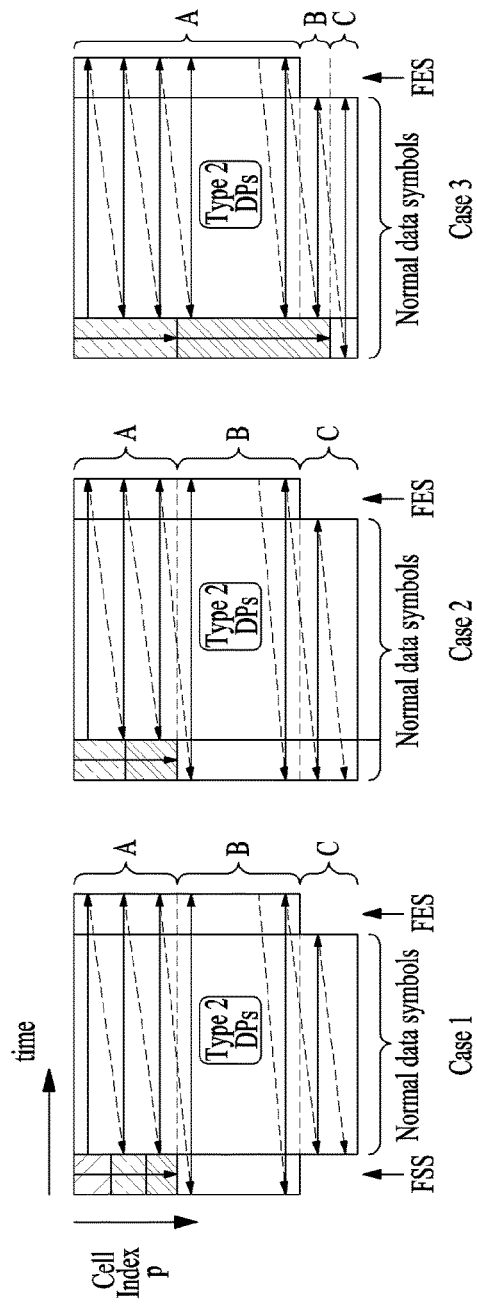

FIG. 21 illustrates DP mapping according to an embodiment of the present invention.

shows an addressing of OFDM cells for mapping type 1 DPs and (b) shows an an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
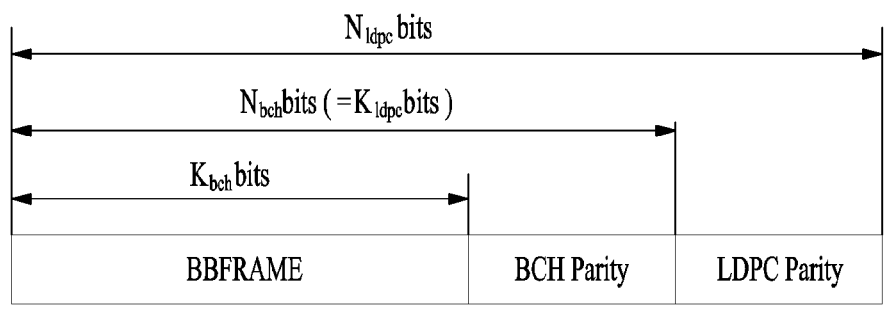
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
| --- | --- | --- | --- | --- | --- |
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 29

| LDPC Rate | $N_{ldpc}$ | $K_{ldpc}$ | $K_{bch}$ | BCH error correction capability | $N_{bch} - K_{bch}$ |
| --- | --- | --- | --- | --- | --- |
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |

TABLE 29-continued

| LDPC Rate | $N_{ldpc}$ | $K_{ldpc}$ | $K_{bch}$ | BCH error correction capability | $N_{bch} - K_{bch}$ |
|---|---|---|---|---|---|
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow expression.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [expression 3]

The parameters for long FECBLOCK and short FECBLOCK are given in the above table 28 and 29, respectively.

The detailed procedure to calculate Nldpc–Kldpc parity bits for long FECBLOCK, is as follows:

1) Initialize the parity bits, $$p_0=p_1=p_2=\ldots=p_{N_{ldpc}-K_{ldpc}-1}=0$$ [expression 4]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0$$ [expression 5]
$$p_{2815} = p_{2815} \oplus i_0$$
$$p_{4837} = p_{4837} \oplus i_0$$
$$p_{4989} = p_{4989} \oplus i_0$$
$$p_{6138} = p_{6138} \oplus i_0$$
$$p_{6458} = p_{6458} \oplus i_0$$
$$p_{6921} = p_{6921} \oplus i_0$$
$$p_{6974} = p_{6974} \oplus i_0$$
$$p_{7572} = p_{7572} \oplus i_0$$
$$p_{8260} = p_{8260} \oplus i_0$$
$$p_{8496} = p_{8496} \oplus i_0$$

3) For the next 359 information bits, is, s=1, 2, . . . , 359 accumulate is at parity bit addresses using following expression.

$$\{x+(s \bmod 360)\times Q_{ldpc}\} \bmod(N_{ldpc}-K_{ldpc})$$ [expression 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1$$ [expression 7]
$$p_{2839} = p_{2839} \oplus i_1$$
$$p_{4861} = p_{4861} \oplus i_1$$
$$p_{5013} = p_{5013} \oplus i_1$$
$$p_{6162} = p_{6162} \oplus i_1$$
$$p_{6482} = p_{6482} \oplus i_1$$
$$p_{6945} = p_{6945} \oplus i_1$$
$$p_{6998} = p_{6998} \oplus i_1$$
$$p_{7596} = p_{7596} \oplus i_1$$
$$p_{8284} = p_{8284} \oplus i_1$$
$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the expression 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i \oplus p_{i-1}, i=1,2,\ldots,N_{ldpc}-K_{ldpc}-1$$ [Math figure 8]

where final content of pi, i=0, 1, . . . Nldpc–Kldpc–1 is equal to the parity bit pi.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |

TABLE 31-continued

| Code Rate | $Q_{ldpc}$ |
| --- | --- |
| 9/15 | 18 |
| 10/15 | 15 |
| 11/15 | 12 |
| 12/15 | 9 |
| 13/15 | 6 |

Figure 23:
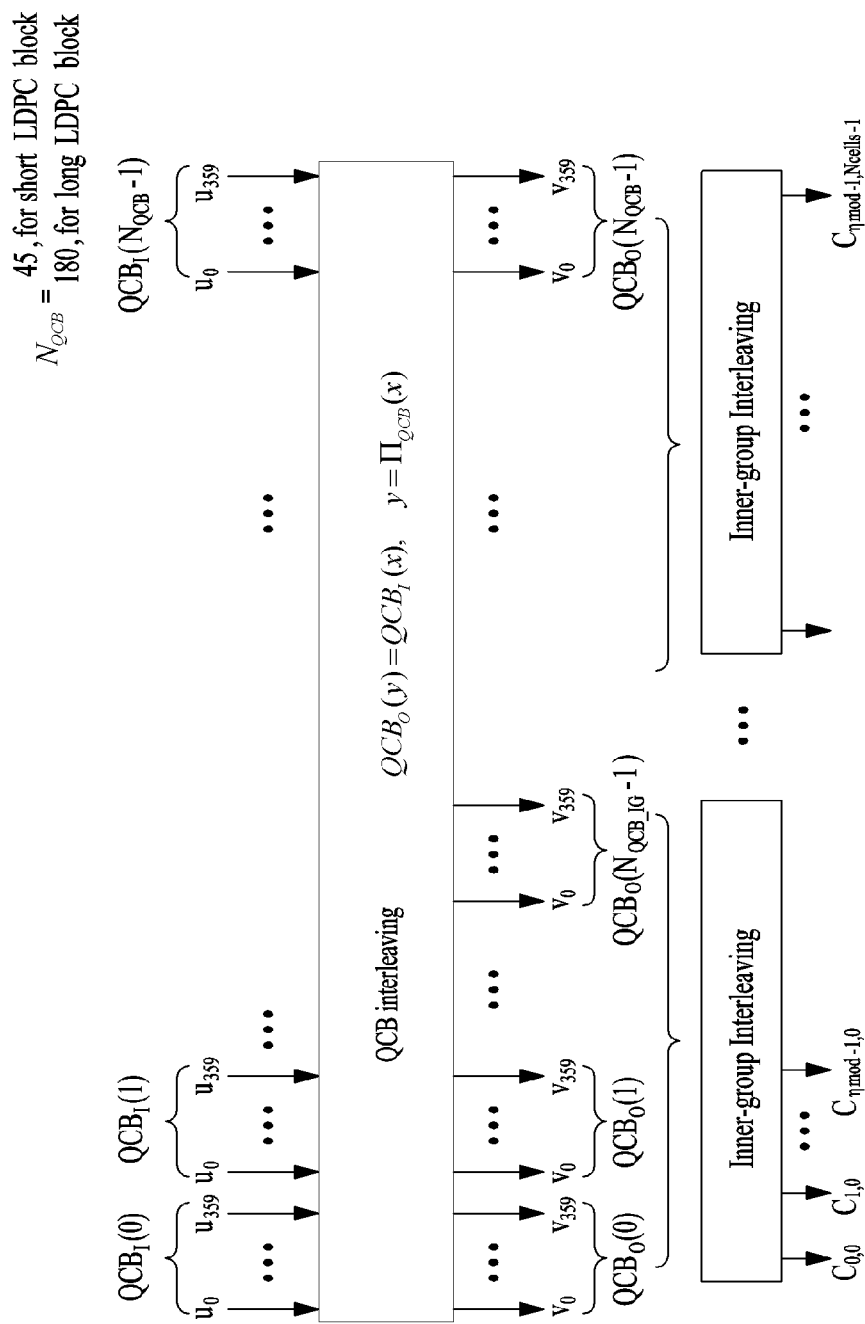
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | $\eta_{mod}$ | $N_{QCB\_IG}$ |
| --- | --- | --- |
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24A:
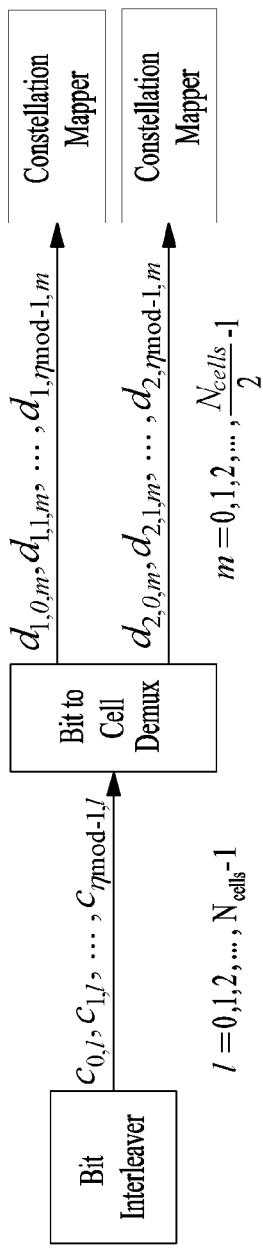
FIGS. 24A-24B illustrate a cell-word demultiplexing according to an embodiment of the present invention.
Figure 24B:
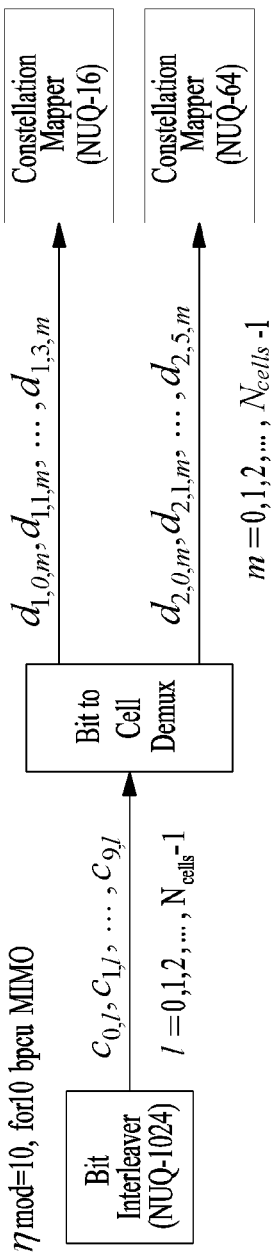

FIG. 24 illustrates a cell-word demultiplexing according to an embodiment of the present invention.

FIG. 24 shows a cell-word demultiplexing for 8 and 12 bpcu MIMO and (b) shows a cell-word demultiplexing for 10 bpcu MIMO.

Each cell word (c0,1, c1,1, . . . , cη mod-1,1) of the bit interleaving output is demultiplexed into (d1,0,m, d1,1, m . . . , d1,η mod-1,m) and (d2,0,m, d2,1,m . . . , d2,η mod-1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1, m . . . , d1,3,m) and (d2,0,m, d2,1,m . . . , d2,5,m), as shown in (b).

Figure 25A:
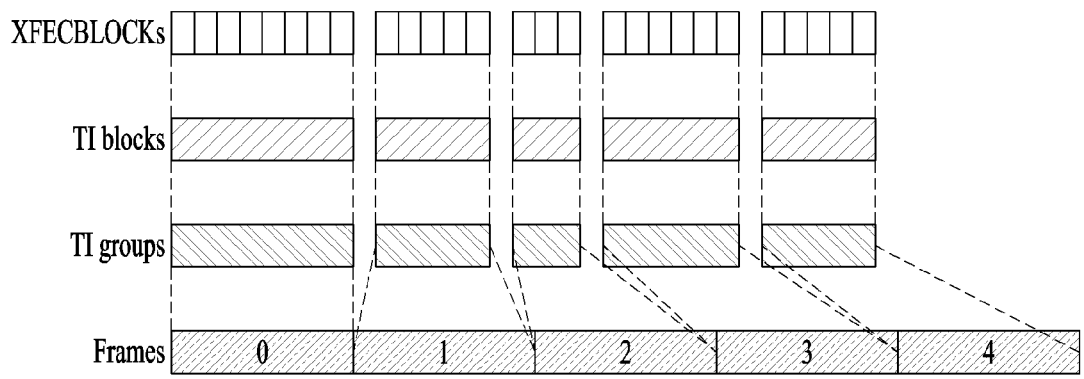
FIGS. 25A-25C illustrate a time interleaving according to an embodiment of the present invention.
Figure 25B:
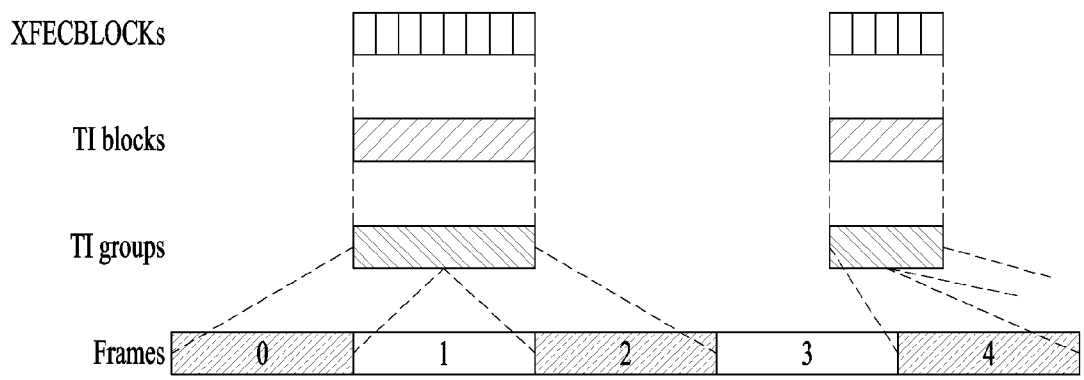
Figure 25C:
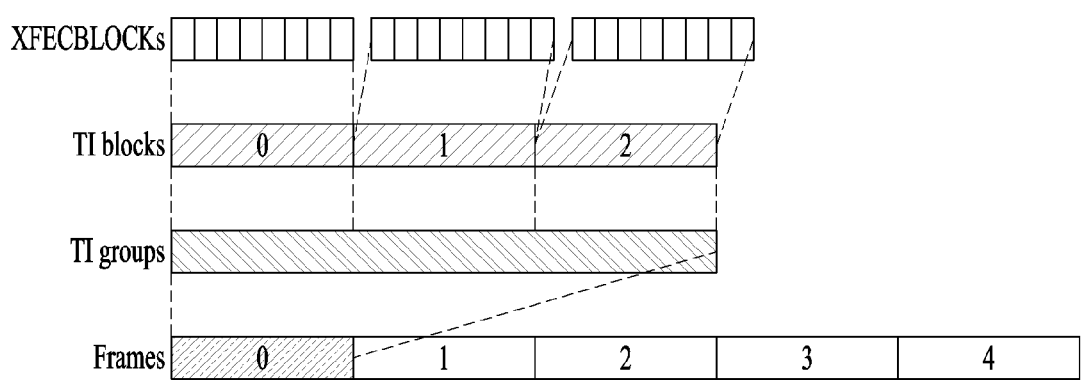

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide a maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, K, d_{n,s,0,N_{cells}-1}, d_{n,s,1,0}, K, d_{n,s,1,N_{cells}-1}, K,$$
$$d_{n,s,N_{xBLOCK\_TI}(n,s)-1,0}, K, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{ encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, K, h_{n,s,i}, K, h_{n,s,N_{xBLOCK\_TI}(n,s) \times N_{cells}-1}),$$

where $h_{n,s,i}$ is the ith output cell (for i=0,K, $N_{xBLOCK\_TI}$(n, s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r$=$N_{cells}$ while the number of columns $N_c$ is equal to the number $N_{xBLOCK\_TI}$(n, s).

Figure 26B:
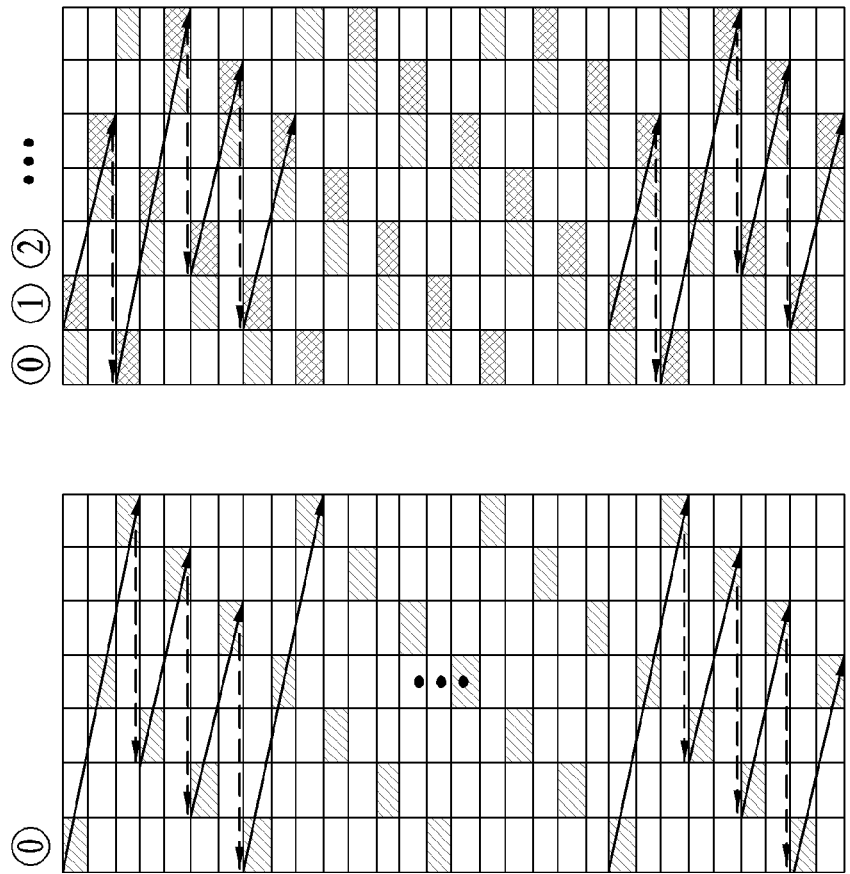
FIGS. 26A-26B illustrate the basic operation of a twisted row-column block interleaver according to an embodiment of the present invention.
Figure 26A:
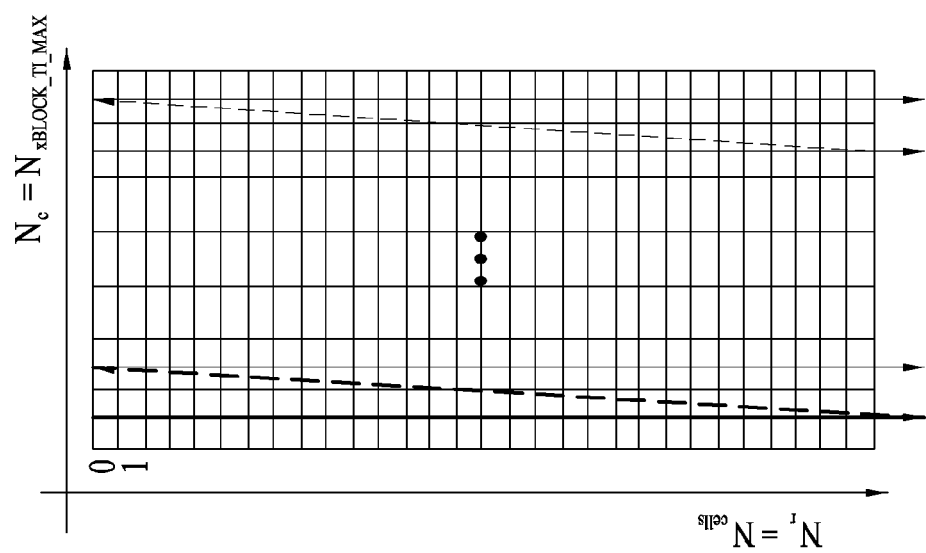

FIG. 26 illustrates the basic operation of a twisted row-column block interleaver according to an embodiment of the present invention.

FIG. 26 (a) shows a writing operation in the time interleaver and FIG. 26(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, . . . , $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$, as follows expression.

$$\text{GENERATE}(R_{n,s,i}, C_{n,s,i}) = \qquad \text{[expression 9]}$$
$$\{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}$(n,s), and it is determined by $N_{xBLOCK\_TI\_MAX}$ given in the PLS2-STAT as follows expression.

for [expression 10]

$$\begin{cases} N'_{xBLOCK\_TI\_MAX} = \\ N_{xBLOCK\_TI\_MAX} + 1, & \text{if } N_{xBLOCK\_TI\_MAX} \text{mod} 2 = 0 \\ N'_{xBLOCK\_TI\_MAX} = \\ N_{xBLOCK\_TI\_MAX}, & \text{if } N_{xBLOCK\_TI\_MAX} \text{mod} 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
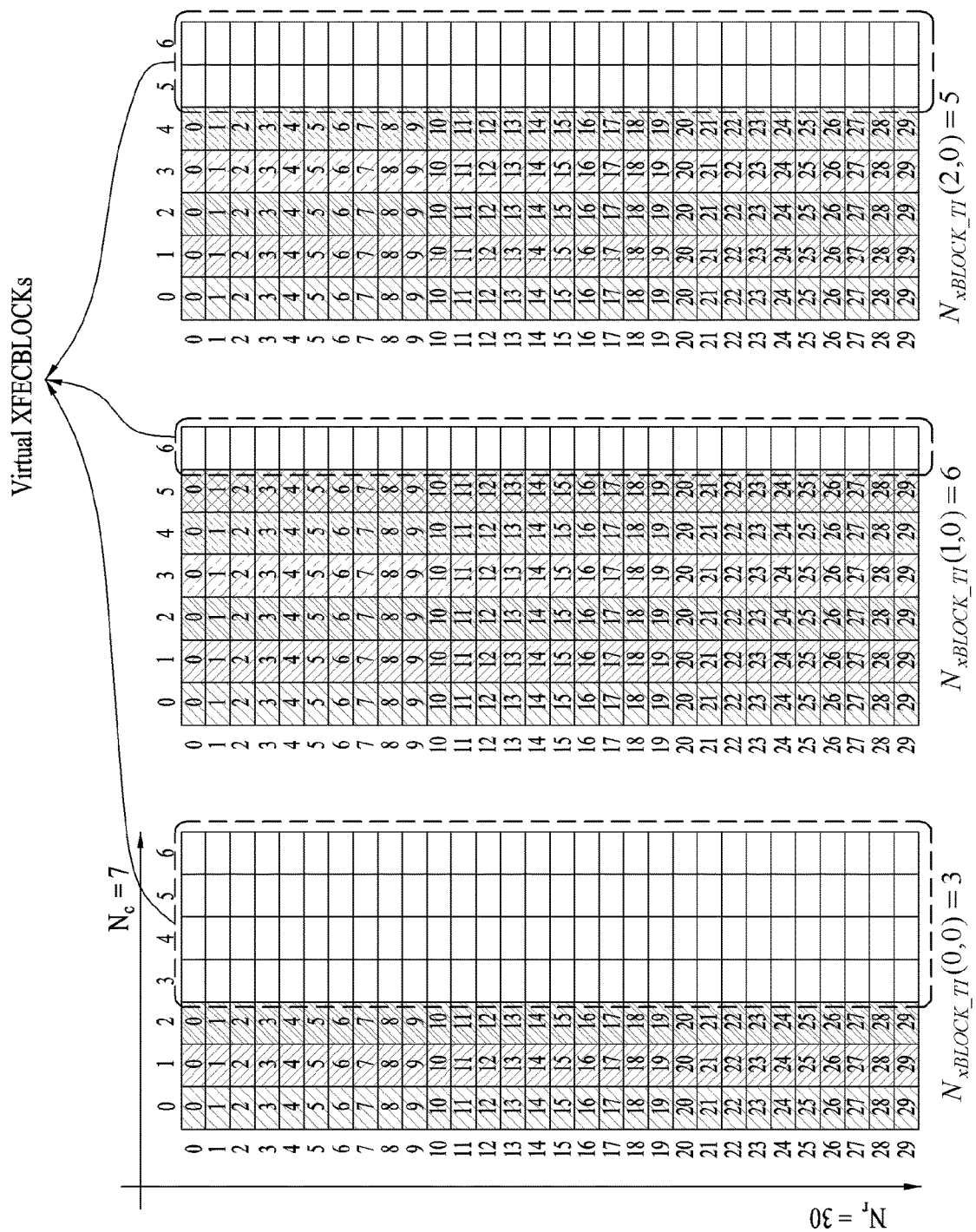
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}$(0,0)=3, $N_{xBLOCK\_TI}$(1, 0)= 6, $N_{xBLOCK\_TI}$(2,0)=5.

The variable number $N_{xBLOCK\_TI}$(n,s)=$N_r$ will be less than or equal to $N'_{BLOCK\_TI\_MAX}$. Thus, in order to achieve a single-memory deinterleaving at the receiver side, regardless of $N_{xBLOCK\_TI}$(n,s), the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

[expression11]

```
p = 0;
for i = 0; i < N_cells N'_xBLOCK_TI_MAX; i = i + 1
{GENERATE (R_{n,s,i}, C_{n,s,i});
V_i = N_r C_{n,s,j} + R_{n,s,j}
```

[expression11]

$$\text{if } V_i < N_{cells}N_{xBLOCK\_TI}(n,s)$$
$$\{$$
$$Z_{n,s,p} = V_i; \ p = p + 1;$$
$$\}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 28:
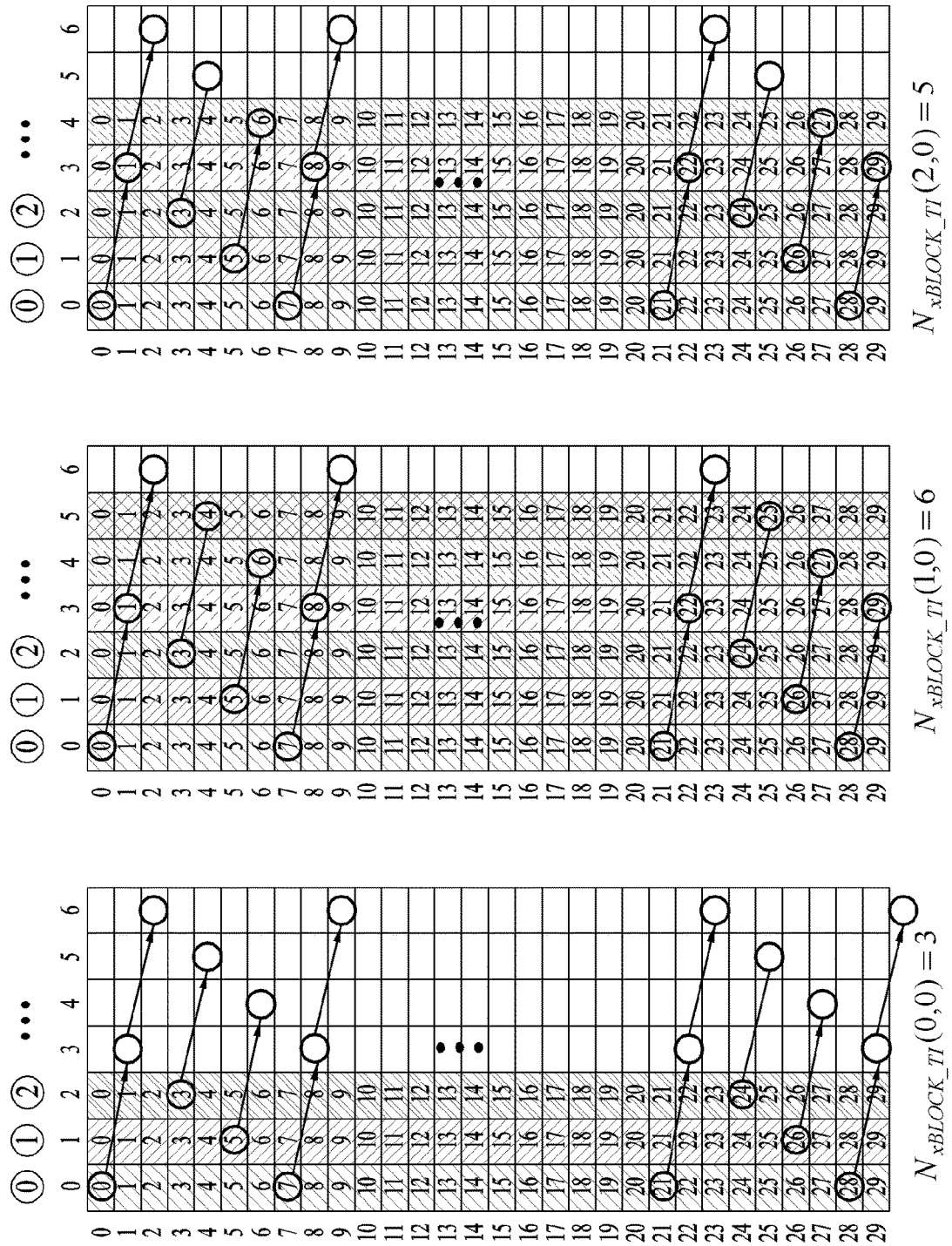
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells} N_{xBLOCK\_TI}(n,s)$ the value of Vi is skipped and the next calculated value of Vi is used.

Figure 29:
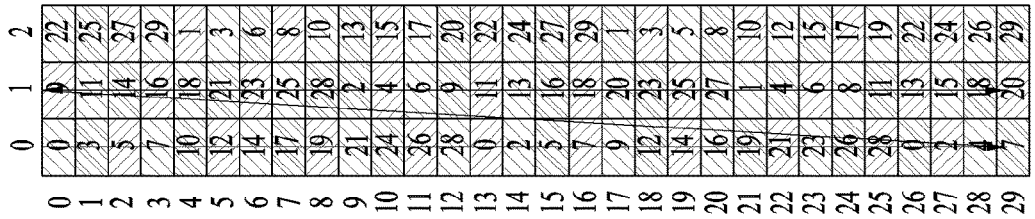
FIG. 29 illustrates interleaved XFECBLOCKs from each interleaving array according to an embodiment of the present invention.

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCL\_TI\_MAX}=7$ and Sshift=3.

The frequency interleaving process according to one embodiment of the present invention will hereinafter be described.

The frequency interleaver 7020 according to one embodiment is configured to apply different interleaving sequences to respective cells corresponding to each OFDM symbol so as to improve the frequency diversity performance in the OFDM symbol structure composed of a plurality of cells.

In the present invention, the above-mentioned frequency interleaving method may be referred to as 'random frequency interleaving' or 'random FI', and may also be changed according to designer's intention.

The above-mentioned broadcast signal transmission apparatus or the frequency interleaver 7020 contained in the broadcast signal transmission apparatus may apply different interleaving sequences either to constituent symbols (i.e., respective symbols) of at least one frame or to respective cells corresponding to two paired symbols, and may perform frequency interleaving, thereby obtaining the frequency diversity.

The at least one symbol may be converted into at least one OFDM symbols in a subsequent modulation process. That is, the at least one symbol may be converted into each OFDM symbol or two paired OFDM symbols (i.e., pair-wise OFDM symbol or each OFDM symbol pair).

The frequency interleaver according to one embodiment may perform frequency interleaving of cells corresponding to OFDM symbols entered using the frequency interleaving address generated on the basis of the main interleaving sequence (or basic interleaving sequence) and the symbol offset.

Figure 30:
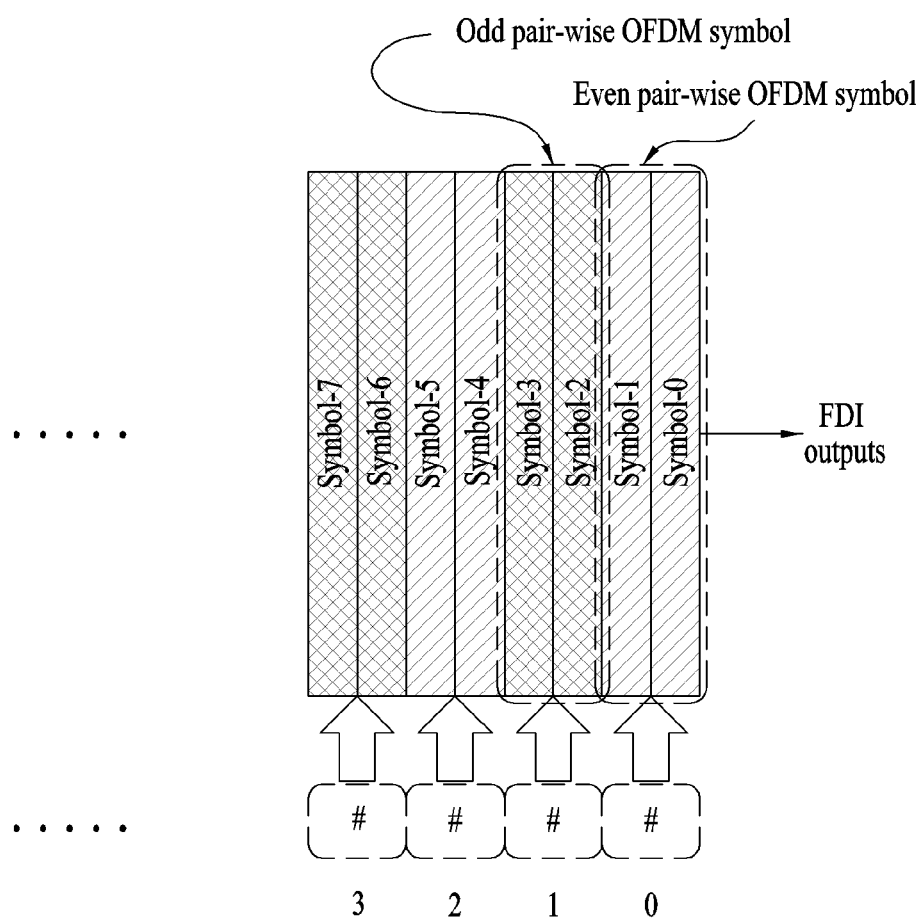
FIG. 30 is a conceptual diagram illustrating a frequency deinterleaving process according to an embodiment of the present invention.

FIG. 30 is a conceptual diagram illustrating a frequency deinterleaving process according to an embodiment of the present invention.

Referring to FIG. 30, the broadcast signal reception apparatus according to an embodiment may perform reverse processing of the above-mentioned frequency interleaving process using a single memory.

FIG. 30 shows the deinterleaving process in which a single memory is used for data cells corresponding to the successively received OFDM symbols.

Basically, the frequency interleaving according to one embodiment may be carried out according to the reverse process of the above-mentioned frequency interleaving.

In other words, in association with data cells corresponding to the successively received OFDM symbols as shown in the left side of FIG. 30, the broadcast signal reception apparatus according to the embodiment may perform reverse processing of Read/Write (R/W) operations of the above-mentioned frequency interleaving using the single memory. In this case, memory use efficiency may increase only using the single memory. This is the effect generated according to a ping-pong interleaving operation used in the transmission part.

FIG. 31 is a conceptual diagram illustrating deinterleaving of the single memory in association with data segments corresponding to the input OFDM symbols.

FIG. 31 is a conceptual diagram illustrating the broadcast signal reception apparatus configured to apply the interleaving sequence used in the broadcast signal transmission apparatus (or the frequency interleaver 7020) to data symbols corresponding to each pair-wise OFDM symbol so as to perform deinterleaving, or a conceptual diagram illustrating the operations of the frequency deinterleaver of the broadcast signal reception apparatus.

As described above, the broadcast signal reception apparatus according to one embodiment may perform reverse processing of the above-mentioned frequency interleaving process using the single memory. FIG. 31 shows the operations of the broadcast signal reception apparatus configured to perform single memory frequency deinterleaving on data symbols corresponding to the successively received OFDM symbols.

The broadcast signal reception apparatus according to one embodiment may perform reverse processing of the above-mentioned frequency interleaver 7020. Therefore, the deinterleaving sequences may correspond to the above-mentioned interleaving sequences.

The frequency interleaver 7020 configured to generate the random interleaving sequence will hereinafter be described.

The random interleaving sequence generator may be the frequency interleaver, or may be a block or module contained in the frequency interleaver.

The random interleaving sequence generator may be referred to as the interleaving address generator or the interleaving sequence generator, and may also be changed according to designer's intention. The interleaving sequence generator according to an embodiment of the present invention may include a basic interleaving sequence generator, a symbol offset generator, a modulo operator, and an address check block. The basic interleaving sequence generator according to one embodiment may be referred to as a random main sequence generator. The address check block may be referred to as an index check block. Names, locations, functions, etc. of respective blocks may be changed according to designer's intention. As described above, the FFT mode or FFT size according to one embodiment of the present invention may be any one of 8K, 16K, 32K, etc., and may be changed according to designer's intention.

The frequency interleaver of the 32K FFT mode according to the embodiment will hereinafter be described.

The frequency interleaver of the 32 FFT mode may apply the same interleaving sequence or the same interleaving address to data (or data cells) corresponding to a pair of OFDM symbols (hereinafter referred to as an OFDM symbol pair) as described above. In this case, the frequency interleaver of the 32K FFT mode according to one embodiment may write data in the memory by applying the interleaving sequence to data cells corresponding to each even symbol of the OFDM symbol pair. The frequency interleaver of the 32K FFT mode may read data from the memory by applying the interleaving sequence to data cells corresponding to each odd symbol of the OFDM symbol pair. In addition, the write and read operations of the frequency interleaver according to one embodiment may be successively achieved in input data cells, and may be simultaneously carried out. That is, assuming that the frequency interleaver according to one embodiment randomly writes data cells corresponding to the even symbol in the memory, and other data cells corresponding to the odd symbol are then input, data cells corresponding to the written even symbol are linearly read from the memory and at the same time data cells corresponding to the odd symbol can also be linearly written in the memory. Subsequently, the data cells corresponding to the odd symbol written in the memory may be read at random. In addition, the frequency interleaver according to one embodiment is operated in data cells corresponding to the OFDM symbol pair, such that the number of symbols corresponding to the OFDM symbol located in a signal frame is always denoted by an even number.

The frequency interleaver of the 32K FFT mode may improve random characteristics by applying different interleaving sequences to respective data cells corresponding to each OFDM symbol pair, thereby maximizing diversity performance. In more detail, the frequency interleaver of 32K FFT mode may generate different interleaving sequences by rotating the basic interleaving sequence to data cells corresponding to each OFDM symbol pair by a symbol offset. In this case, the symbol offset value may be generated in different ways according to data cells corresponding to each OFDM symbol pair. Therefore, data cells corresponding to the even symbol of the OFDM symbol pair may be linearly read by a transmitter during the frequency interleaving process, and data cells corresponding to the odd symbol are linearly written, such that the broadcast signal reception apparatus or the frequency deinterleaver contained in the broadcast signal reception apparatus may perform frequency deinterleaving using the single memory. In this case, a necessary or requested maximum memory size may be 32K.

Equations indicating the operations of 32K FFT mode-frequency interleaver according to the embodiment are shown in FIG. 32.

The blocks shown in FIG. 32 may be equations for indicating the frequency interleaving input and output (I/O) operations associated with data cells corresponding to the even symbol of the OFDM symbol pair and other data cells corresponding to the odd symbol of the OFDM symbol pair.

The left part may indicate output data (interleaved vector) in which the frequency interleaving is performed, and the right part may indicate input data cells (interleaver input vectors) of the frequency interleaving. In FIG. 32, $X_{m,1,p}$ may indicate the cell index (p) to be mapped to the $1^{st}$ OFDM symbol of the m-th frame, and $X_{m,1,H(p)}$ may indicate that the cell index (p) to be mapped to the $1^{st}$ OFDM symbol of the m-th frame has been read according to the interleaving address (or the interleaving sequence).

That is, the equations shown in FIG. 32 may indicate that data cells corresponding to the even symbol of the OFDM symbol pair have been written in the memory using the interleaving sequence, and may also indicate the data cells corresponding to the odd symbol have been read according to the interleaving sequence.

The frequency interleaver of the 16K FFT mode according to one embodiment will hereinafter be described.

The frequency interleaver of the 16K FFT mode may apply the same interleaving sequence to cells corresponding to the OFDM symbol pair. In this case, the frequency interleaver of the 16K FFT mode according to one embodiment may write data in the memory by applying the interleaving sequence to data cells corresponding to the even symbol of the OFDM symbol pair in the same manner as in the 32K FFT mode-frequency interleaver, and may read data from the memory by applying the interleaving sequence to data cells corresponding to the odd symbol of the OFDM symbol pair. The operations of the frequency interleaver of the 16K FFT mode are identical to those of the frequency interleaver of the 32K FFT mode, and as such a detailed description thereof will herein be omitted for convenience of description. In conclusion, the frequency interleaver of the 16K FFT mode according to the embodiment may allow the receiver to perform frequency deinterleaving using the single memory. In this case, a necessary or requested maximum memory size may be 16K.

In addition, the frequency interleaver of the 16K FFT mode according to one embodiment may perform frequency interleaving by applying different interleaving sequences to data cells corresponding to each OFDM symbol. In this case, the frequency interleaver of the 16K FFT mode according to one embodiment may use the interleaving sequence so as to randomly read data cells corresponding to the input symbol from the memory, and the number of OFDM symbols contained in the frame is not limited thereto. In addition, the frequency interleaver of the 16K FFT mode according to the embodiment may generate different interleaving sequences by rotating the basic interleaving sequence for each data cell corresponding to each OFDM symbol by a symbol offset even when different interleaving sequences are applied to data cells corresponding to each OFDM symbol. In this case, the symbol offset value may be generated in different ways according to data cells corresponding to the OFDM symbol pair.

In this case, the receiver may perform frequency interleaving using double memories. In this case, a necessary or requested maximum memory size may be 32K.

Equations indicating the operations of 16K FFT mode-frequency interleaver according to the embodiment are shown in FIGS. 33(a) and 33(b).

FIG. 33(a) illustrates the equations for use in the case in which the frequency interleaver of the 16K FFT mode applies the same interleaving sequence to data cells corresponding to the OFDM symbol pair. FIG. 33(a) illustrates the equations for indicating the frequency interleaving input/output (I/O) operations associated with the data cells corresponding to the even symbol of the OFDM symbol pair and other data cells corresponding to the odd symbol.

FIG. 33(b) illustrates the equations for use in the case in which the frequency interleaver of the 16K FFT mode performs the read operation by applying different interleaving sequences to data cells corresponding to each OFDM symbol.

In more detail, the left part of the equations may indicate output data (an interleaved vector) in which frequency interleaving is performed, and the right part of the equations may indicate input data cells (interleaver input vectors) of the frequency interleaving.

In FIG. 33, $X_{m,1,p}$ may indicate the cell index (p) to be mapped to the $1^{st}$ OFDM symbol of the m-th frame, and $X_{m,1,H(p)}$ may indicate that the cell index (p) to be mapped to the $1^{st}$ OFDM symbol of the m-th frame has been read according to the interleaving address (or the interleaving sequence).

Therefore, the equations shown in FIG. 33(a) may indicate that data cells corresponding to the even symbol of the OFDM symbol pair have been written in the memory using the interleaving sequence, and may also indicate the data cells corresponding to the odd symbol have been read according to the interleaving sequence.

In addition, the equations shown in FIG. 33(b) may illustrate the process for reading data cells corresponding to each OFDM symbol using the interleaving sequence.

The frequency interleaver of the 8K FFT mode according to another embodiment will hereinafter be described.

The frequency interleaver of the 8K FFT mode according to the embodiment may apply different interleaving sequences to respective data cells corresponding to each OFDM symbol. In this case, the 8K FFT mode-frequency interleaver according to one embodiment of the present invention may use the interleaving sequence so as to randomly read data cells corresponding to the input symbol from the memory, and the number of OFDM symbols contained in the frame is not limited thereto. In addition, the frequency interleaver of the 8K FFT mode according to the embodiment may generate different interleaving sequences by rotating the basic interleaving sequence for each data cell corresponding to each OFDM symbol by a symbol offset even when different interleaving sequences are applied to data cells corresponding to each OFDM symbol. In this case, the symbol offset value may be generated in different ways according to data cells corresponding to the OFDM symbol pair.

In this case, the receiver may perform frequency deinterleaving using double memories. In this case, a necessary or requested maximum memory size may be 16K.

FIG. 34 illustrates the equations indicating the operations of the frequency interleaver of the 8K FFT mode according to the embodiment of the present invention.

The equations shown in FIG. 34 may indicate the frequency interleaving input/output (I/O) operations for use in the case in which the 8K FFT mode-frequency interleaver performs the read operation by applying different interleaving sequences to data cells corresponding to each OFDM symbol. In more detail, the left part may indicate output data (interleaved vector) in which the frequency interleaving is performed, and the right part may indicate input data cells (interleaver input vectors) of the frequency interleaving.

In FIG. 34, $X_{m,1,H(p)}$ may indicate that the cell index (p) to be mapped to the $1^{st}$ OFDM symbol of the m-th frame has been read according to the interleaving address (or the interleaving sequence).

Therefore, the equations shown in FIG. 34 may indicate the process for reading data cells corresponding to each OFDM symbol using the interleaving sequence.

FIG. 35 illustrates the equations indicating the frequency interleaver input/output (I/O) operations according to respective FFT modes.

The equations contained in the block depicted at the upper part of FIG. 35 may indicate the relationship between the frequency interleaver input operation and the frequency interleaver output operation of the 32K FFT mode and the 16K FFT mode, and may indicate the case in which one interleaving sequence is applied to data cells corresponding to a single OFDM symbol pair.

The equations contained in a lower part of FIG. 35 may indicate the relationship between the frequency interleaver I/O operations of the 16K FFT mode and the 8K FFT mode, and may indicate the case in which one interleaving sequence is applied to data cells corresponding to a single OFDM symbol.

As described above, the left part may indicate the interleaved vectors corresponding to the frequency interleaver output, and the right part may indicate the input data vectors (or the input vectors) corresponding to the frequency interleaver input.

Figure 36:
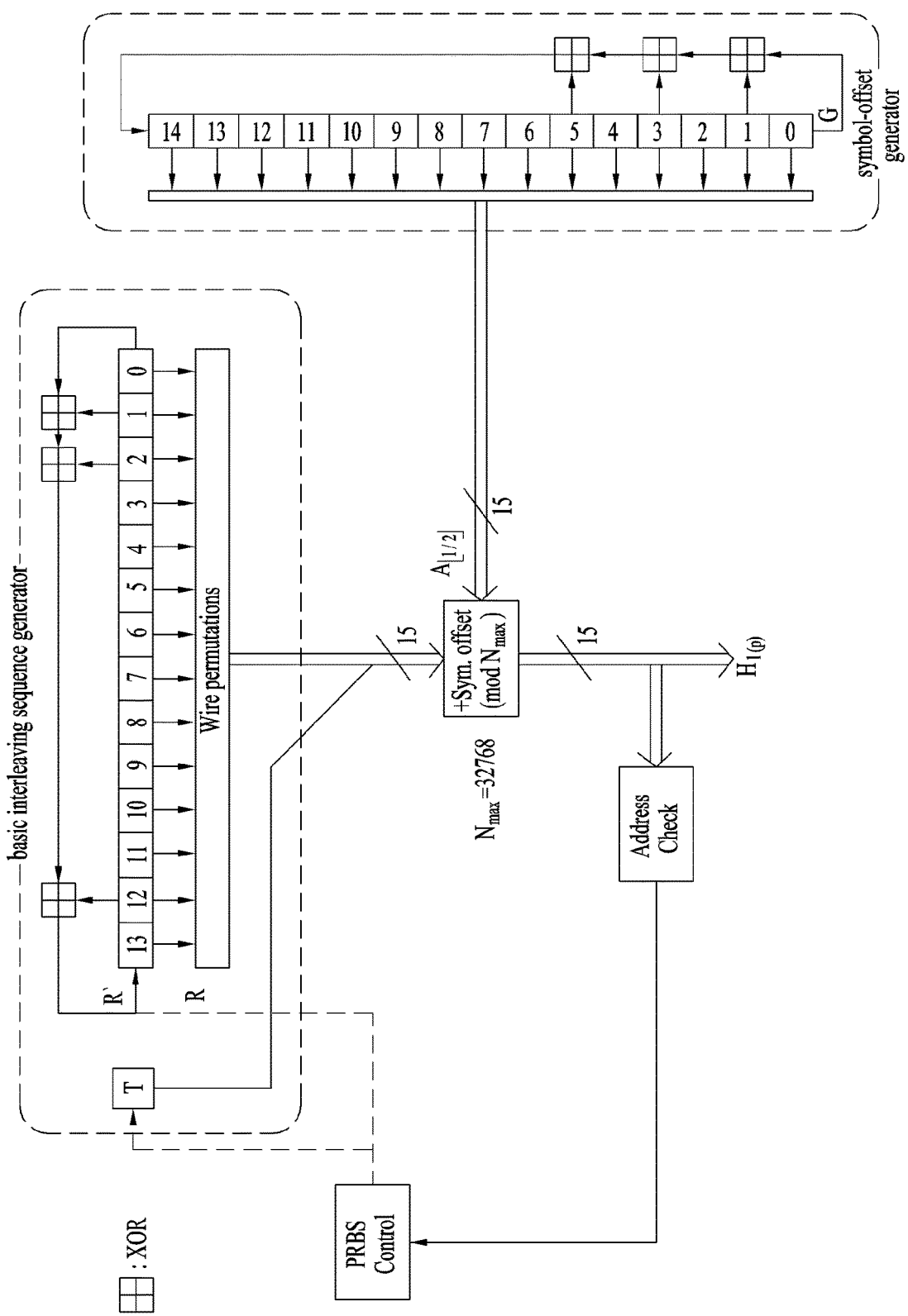
FIG. 36 illustrates the operations of the frequency interleaver of the 32K FFT mode according to another embodiment of the present invention.

FIG. 36 illustrates the operations of the frequency interleaver of the 32K FFT mode according to another embodiment of the present invention.

Referring to FIG. 36, the frequency interleaver of the 32K FFT mode may interleave the input OFDM symbol pair using the interleaving sequence or the interleaving address as described above. The 32K FFT mode-frequency interleaver shown in FIG. 36 may include a basic interleaving sequence generator, a symbol offset generator, a modulo operator, and an address check block so as to generate the interleaving sequence or the interleaving address, and the above constituent elements will hereinafter be described.

The basic interleaving sequence generator may include a basic random address generator and a wire permutation block. The basic random address generator may include a 1-bit toggling and 14-bit PN generator, and may operate to generate quasi-random characteristics during interleaving. The wire permutation block may change the order of bits when an address composed of a decimal number is constructed using a PRBS register value. In this case, the wire permutation block may change the order of bits using a predetermined wire-permutation table.

In the case of the 32K FFT mode, the same wire-permutation table may be applied to data cells corresponding to respective symbols constructing the OFDM symbol pair. A detailed description thereof is as follows.

The symbol offset generator may operate on the basis of the OFDM symbol pair, and may generate and output the symbol offset value for cyclically shifting the basic interleaving sequence generated from the basic interleaving sequence generator.

The modulo operator may start operation when the output data exceeds 'Nmax'. In the case of 32K FFT mode, 'Nmax' may be set to 32768.

If $H_1(p)$ {i.e., the interleaving sequence value (or the interleaving address value)} of the output 15 bits is higher than the input data vector size (Ndata), the address check block and the PRBS controller may not use output values and discard the output values, and may repeatedly adjust the operation of the basic interleaving sequence generator in such a manner that the interleaving address value does not exceed the Nmax value.

As described above, the modulo operator may also operate at a time earlier than the address check block. As a result, the receiver can perform deinterleaving using the single memory even when data vectors (or data cells) of the OFDM symbol pair are different in size.

Figure 37:
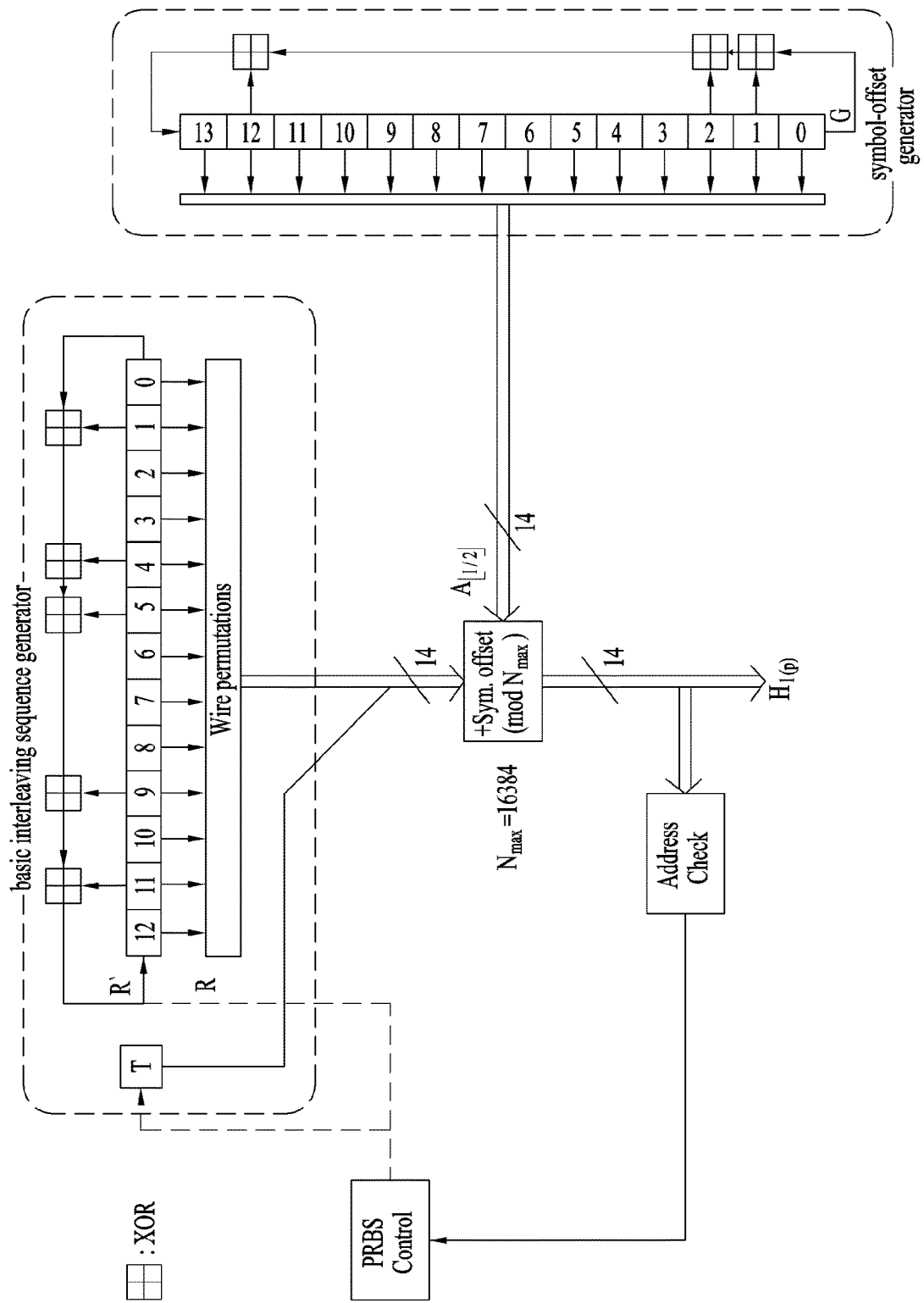
FIG. 37 is a conceptual diagram illustrating the 16K FFT mode-frequency interleaver according to another embodiment of the present invention.

FIG. 37 is a conceptual diagram illustrating the 16K FFT mode-frequency interleaver according to another embodiment of the present invention.

Referring to FIG. 37, the frequency interleaver of the 16K FFT mode may perform interleaving by applying the interleaving sequence or the interleaving address to data cells corresponding to either the input OFDM symbol pair or the input OFDM symbol as described above. The 16K FFT mode-frequency interleaver shown in FIG. 37 may include a basic interleaving sequence generator, a symbol offset generator, a modulo operator, and an address check block so as to generate the interleaving sequence or the interleaving address. A detailed description of the above-mentioned constituent components is as follows.

The basic interleaving sequence generator may include a basic random address generator and a wire permutation block. The basic random address generator may include a 1-bit toggling and 13-bit PN generator, and may operate to generate quasi-random characteristics during interleaving. The wire permutation block may change the order of bits when an address composed of a decimal number is constructed using a PRBS register value. In this case, the wire permutation block may change the order of bits using a predetermined wire-permutation table. In the case of the 16K FFT mode, the same wire-permutation table may be applied to data cells corresponding to respective symbols constructing the OFDM symbol pair. A detailed description thereof is as follows.

The symbol offset generator may operate on the basis of the OFDM symbol pair, and may generate and output the symbol offset value for cyclically shifting the basic interleaving sequence generated from the basic interleaving sequence generator.

The modulo operator may start operation when the output data exceeds 'Nmax'. In the case of 16K FFT mode, 'Nmax' may be set to 16384.

If $H_1(p)$ {i.e., the interleaving sequence value (or the interleaving address value)} of the output 14 bits is higher than the input data vector size (Ndata), the address check block and the PRBS controller may not use output values and discard the output values, and may repeatedly adjust the operation of the basic interleaving sequence generator in such a manner that the interleaving address value does not exceed the Nmax value.

As described above, the modulo operator may also operate at a time earlier than the address check block. As a result, the receiver can perform deinterleaving using the single memory even when data vectors (or data cells) of the OFDM symbol pair are different in size.

Figure 38:
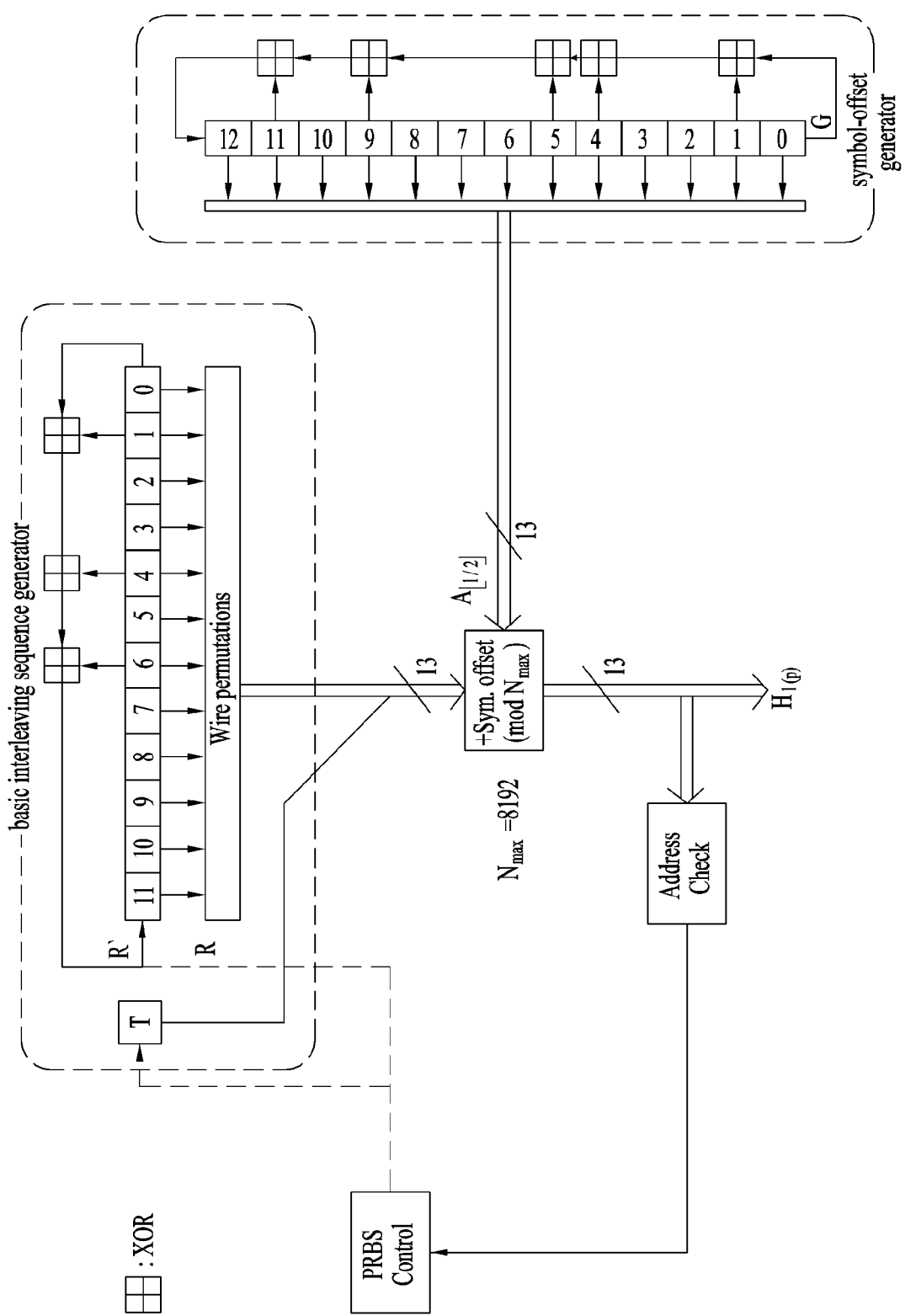
FIG. 38 is a conceptual diagram illustrating the 8K FFT mode-frequency interleaver according to another embodiment of the present invention.

FIG. 38 is a conceptual diagram illustrating the 8K FFT mode-frequency interleaver according to another embodiment of the present invention.

Referring to FIG. 37, the frequency interleaver of the 8K FFT mode may perform interleaving by applying the interleaving sequence or the interleaving address to input symbols as described above. The 8K FFT mode-frequency interleaver shown in FIG. 38 may include a basic interleaving sequence generator, a symbol offset generator, a modulo operator, and an address check block so as to generate the interleaving sequence or the interleaving address. A detailed description of the above-mentioned constituent components is as follows.

The basic interleaving sequence generator may include a basic random address generator and a wire permutation block. The basic random address generator may include a 1-bit toggling and 12-bit PN generator, and may operate to generate quasi-random characteristics during interleaving. The wire permutation block may change the order of bits when an address composed of a decimal number is constructed using a PRBS register value. In this case, the wire permutation block may change the order of bits using a predetermined wire-permutation table. In the case of the 8K FFT mode, different wire permutation tables may be applied to data cells corresponding to respective symbols constructing the OFDM symbol pair. A detailed description thereof is as follows.

The symbol offset generator may operate on the basis of the OFDM symbol pair, and may generate and output the symbol offset value for cyclically shifting the basic interleaving sequence generated from the basic interleaving sequence generator.

The modulo operator may start operation when the output data exceeds 'Nmax'. In the case of 8K FFT mode, 'Nmax' may be set to 8192.

If $H_1(p)$ {i.e., the interleaving sequence value (or the interleaving address value)} of the output 13 bits is higher than the input data vector size (Ndata), the address check block and the PRBS controller may not use output values and discard the output values, and may repeatedly adjust the operation of the basic interleaving sequence generator in such a manner that the interleaving address value does not exceed the Nmax value.

As described above, the modulo operator may also operate at a time earlier than the address check block. As a result, the receiver can perform deinterleaving using the single memory even when data vectors (or data cells) of the OFDM symbol pair are different in size.

FIG. 39 shows wire permutation tables according to one embodiment of the present invention.

Referring to FIG. 39, a first row of each table may denote bit positions of the input bit sequence, and second and third rows may denote the bit position changed by permutation.

FIG. 39(a) is one example of the wire permutation table for the 3K FFT mode, and illustrates the wire permutation table equally applied to data cells corresponding to constituent symbols of the input OFDM symbol pair.

FIG. 39(b) is one example of the wire permutation table for the 16K FFT mode, and illustrates the wire permutation table equally applied to data cells corresponding to constituent symbols of the input OFDM symbol pair.

FIG. 39(c) is one example of the wire permutation table for the 16K FFT mode, and illustrates the wire permutation table differently applied to data cells corresponding to constituent symbols of each OFDM symbol pair. In FIG. 39(c), a second row may denote the changed bit position of data cells corresponding to the even symbol of the input OFDM symbol pair, and a third row may denote the changed bit position of data cells corresponding to the odd symbol of the input OFDM symbol pair.

FIG. 39(d) is one example of the wire permutation table for the 8K FFT mode, and illustrates the wire permutation table differently applied to respective data cells corresponding to each OFDM symbol pair. A detailed description of the respective tables is identical to those of FIG. 39(c), and as such a detailed description thereof will herein be omitted for convenience of description. The respective bit positions may be changed according to designer's intention.

FIG. 40 is the equation illustrating the operations of the basic interleaving sequence generator according to one embodiment of the present invention.

As described above, the basic interleaving sequence generator according to one embodiment may generate a binary word (R') having different sizes of bit numbers according to individual FFT modes. FIG. 40 is the equation illustrating a process for generating the binary word. The process for generating the binary word as shown in FIG. 40 may be changed to an arbitrary PRBS. The basic interleaving sequence generator according to one embodiment performs toggling by applying wire permutation to the generated binary word (R'), such that it can output the basic interleaving sequence.

FIG. 41 is the equation illustrating the operations of the symbol offset generator according to one embodiment of the present invention.

As described above, the symbol offset generator according to one embodiment may generate the symbol offset value for each OFDM symbol pair, and the generated symbol offset value may also be equally applied to data cells corresponding to two symbols constructing the OFDM symbol pair. In addition, the symbol offset value may be generated on the basis of the binary word ($G_k$) having a specific value for each FFT mode, and may be changed to an arbitrary PRB.

FIG. 42 is the equation illustrating the interleaving address according to one embodiment of the present invention.

Referring to FIG. 42, the frequency interleaver of the embodiment may generate the interleaving address $H_1(p)$ using the basic interleaving sequence and the symbol offset value.

The equations shown in the upper end of FIG. 42 may denote the process for generating the interleaving address, and the equations shown in the lower part of FIG. 42 may denote the symbol offset. The above-mentioned equations may be changed according to designer's intention.

The frequency interleaver of the 16K FFT mode according to another embodiment will hereinafter be described.

The frequency interleaver of the 16K FFT mode may allocate different interleaving sequences to respective data cells corresponding to each OFDM symbol. In this case, the frequency interleaver of the 16K FFT mode according to one embodiment may use the interleaving sequences to randomly read the data cells corresponding to the input symbol from the memory, and the number of OFDM symbols contained in the frame is not limited thereto. In addition, the frequency interleaver of the 16K FFT mode according to the embodiment may generate different interleaving sequences by rotating the basic interleaving sequence for each OFDM symbol by a symbol offset even when different interleaving sequences are applied to data cells corresponding to each OFDM symbol. In this case, the same symbol offset value may be applied to cells corresponding to each OFDM symbol pair.

In conclusion, the frequency interleaver of the 16K FFT mode may perform frequency interleaving using the single memories. In this case, a necessary or requested maximum memory size may be 16K.

FIG. 43 is the equation indicating the operations of 16K FFT mode-frequency interleaver according to another embodiment of the present invention.

FIG. 43 is a conceptual diagram illustrating the operations of 16K FFT mode-frequency interleaver shown in FIG. 33 according to another embodiment of the present invention. Equations shown in FIG. 43 may be equations for indicating the frequency interleaving input and output (I/O) operations for use in the case in which the 16K FFT mode-frequency interleaver randomly writes data in the memory by applying different interleaving sequences to data cells corresponding to each OFDM symbol.

The left part of the equations shown in FIG. 43 may indicate output data (interleaved vector) in which the frequency interleaving is performed, and the right part of the equations shown in FIG. 43 may indicate input data cells (interleaver input vectors) of the frequency interleaving.

In FIG. 43, $X_{m,1,p}$ may indicate the cell index (p) to be mapped to the $1^{st}$ OFDM symbol of the m-th frame.

As can be seen from FIG. 43, the interleaving sequence may be calculated using the symbol offset and the Nmax value. The value of Nmax in FIG. 43 is identical to those of the above-mentioned drawings.

In addition, the receiver may perform frequency deinterleaving using double memories. In this case, a necessary or requested maximum memory size may be 32K.

The 8K FFT mode-frequency interleaver according to another embodiment will hereinafter be described.

The 8K FFT mode-frequency interleaver may apply the same interleaving sequence to data cells corresponding to the OFDM symbol pair. In this case, the 8K FFT mode-frequency interleaver according to one embodiment may use the interleaving sequence so as to write data in data cells corresponding to the even symbol of the OFDM symbol pair in the same manner as in the 32K FFT mode-frequency interleaver, and may use the interleaving sequence so as to read data from the data cells corresponding to the odd symbol of the OFDM symbol pair. The operations of the 8K FFT mode-frequency interleaver are identical to those of the 32K FFT mode-frequency interleaver, and as such a detailed description thereof will herein be omitted for convenience of description. In conclusion, the 8K FFT mode-frequency interleaver according to the embodiment may allow the receiver to perform frequency deinterleaving using the single memory. In this case, a necessary or requested maximum memory size may be 8K.

In addition, the frequency interleaver of the 8K FFT mode according to one embodiment may use the interleaving sequence so as to randomly write data cells corresponding to the input symbol in the memory, and the number of OFDM symbols contained in the frame is not limited thereto. In addition, the frequency interleaver of the 8K FFT mode according to the embodiment may generate different interleaving sequences by rotating the basic interleaving sequence for each OFDM symbol by a symbol offset even when different interleaving sequences are applied to data cells corresponding to each OFDM symbol. In this case, the symbol offset value may be generated in different ways according to each OFDM symbol pair.

In this case, the receiver may perform frequency deinterleaving using double memories. In this case, a necessary or requested maximum memory size may be 16K.

FIG. 44 is the equation illustrating the operation of the 8K FFT mode-frequency interleaver according to another embodiment of the present invention.

FIG. 44 illustrates the operation of the 8K FFT mode-frequency interleaver shown in FIG. 34 according to another embodiment.

FIG. 44(*a*) is the equation illustrating the operation generated when the 8K FFT mode-frequency interleaver applies the same interleaving sequence to data cells corresponding to the OFDM symbol pair. In more detail, the equation of FIG. 44(*a*) indicates the frequency interleaving input and output not only for the data cells corresponding to the even symbol of the OFDM symbol pair but also for the other data cells corresponding to the odd symbol.

FIG. 44(*b*) is the equation illustrating the operation generated when the 8K FFT mode-frequency interleaver performs the write operation by applying different interleaving sequences to data cells corresponding to each OFDM symbol.

In more detail, the left part of the equation may indicate output data (interleaved vector) in which the frequency interleaving is performed, and the right part may indicate input data cells (interleaver input vectors) of the frequency interleaving.

In FIG. 44, $X_{m,1,p}$ may indicate the cell index (p) to be mapped to the $1^{st}$ OFDM symbol of the m-th frame, and $X_{m,1,H(p)}$ may indicate that the cell index (p) to be mapped to the $1^{st}$ OFDM symbol of the m-th frame has been read according to the interleaving address (or the interleaving sequence).

Therefore, the equation shown in FIG. 44 may indicate that data cells corresponding to the even symbol of the OFDM symbol pair have been written in the memory using the interleaving sequence, and may also indicate the data cells corresponding to the odd symbol have been read according to the interleaving sequence.

In addition, the equation shown in FIG. 44(b) may indicate the process for writing data cells corresponding to each OFDM symbol using the interleaving sequence.

Figures 45, 46:
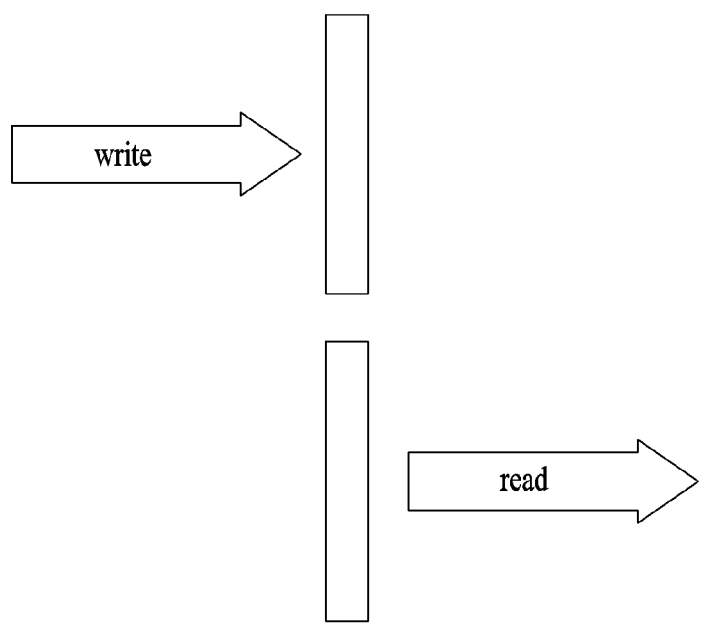
FIG. 45 is the equation illustrating the frequency interleaver input and output according to each FFT mode.
FIG. 46 is a conceptual diagram illustrating the frequency deinterleaving process according to one embodiment of the present invention.

FIG. 45 is the equation illustrating the frequency interleaver input and output according to each FFT mode.

The equation contained in the block of FIG. 45 may indicate the relationship between input data and output data of the frequency interleavers of the 16K FFT mode and the 8K FFT mode, and may indicate the case in which one interleaving sequence is applied to data cells corresponding to one OFDM symbol. As described above, the left part of the equation may indicate output data (interleaved vector) of the frequency interleaver, and the right part may indicate input data vectors (or input vectors) of the frequency interleaver.

FIG. 46 is a conceptual diagram illustrating the frequency deinterleaving process according to one embodiment of the present invention.

In more detail, FIG. 46 illustrates the frequency deinterleaving process of the receiver for use in the case in which the 16K and 8K FFT mode-frequency interleavers perform the frequency interleaving by allocating different interleaving sequences to data cells corresponding to each OFDM symbol. In this case, since the receiver can perform frequency deinterleaving using the double memories as described above, the receiver can perform pong-pong structured frequency deinterleaving. In this case, the basic interleaving sequence for use in the receiver may be identical to that of the transmitter.

The signal frame structure of the broadcast signal transmission/reception apparatus for the next generation broadcast service according to one embodiment of the present invention will hereinafter be described in detail.

Figure 47:
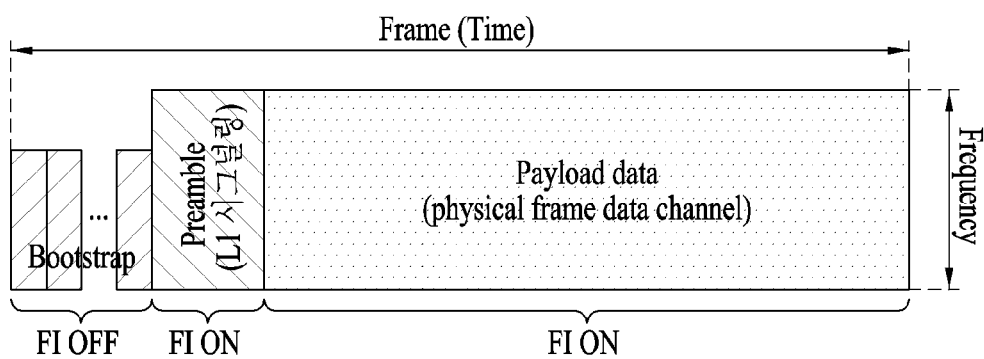
FIG. 47 illustrates the logical structure of the signal frame according to one embodiment of the present invention.

FIG. 47 illustrates the logical structure of the signal frame according to one embodiment of the present invention.

FIG. 47 shows another embodiment of the frames shown in FIGS. 1 to 29. The logical structure of the signal frame according to on embodiment may include a bootstrap, preamble symbols (L1 signaling), and payload data symbols (or data symbols).

The bootstrap shown in FIG. 47 may correspond to the above-mentioned preamble, the preamble symbols shown in FIG. 47 may correspond to the above-mentioned FSS, and the payload data symbols may correspond to normal data symbols. In addition, L1 signaling may correspond to the above-mentioned PLS1 and PLS2 signaling.

The bootstrap according to one embodiment may be inserted into the front part of the output signal frame after IFFT, and may have robustness against the preamble or payload data in such a manner that the broadcast signal reception apparatus can detect the corresponding signal frame. In addition, the bootstrap according to one embodiment may transmit necessary or requisite information to access the necessary broadcast system information and the corresponding broadcast signal system.

The bootstrap according to one embodiment may include Emergency Alert System (EAS) wake-up information, system information, preamble structure indicator information, information regarding the subsequent extended use, etc.

The preamble structure indicator information according to one embodiment may include an FFT mode of the preamble, NOA (Number Of Active carrier) information of the preamble, the number of OFDM symbols constructing the preamble, etc.

Although the above-mentioned frequency interleaving is performed in the preamble symbols and the data symbols as shown in the drawing (FI ON), no frequency interleaving is applied to the bootstrap (FI OFF).

The frequency interleaving of the preamble symbols according to the embodiment will hereinafter be described.

Figure 48:
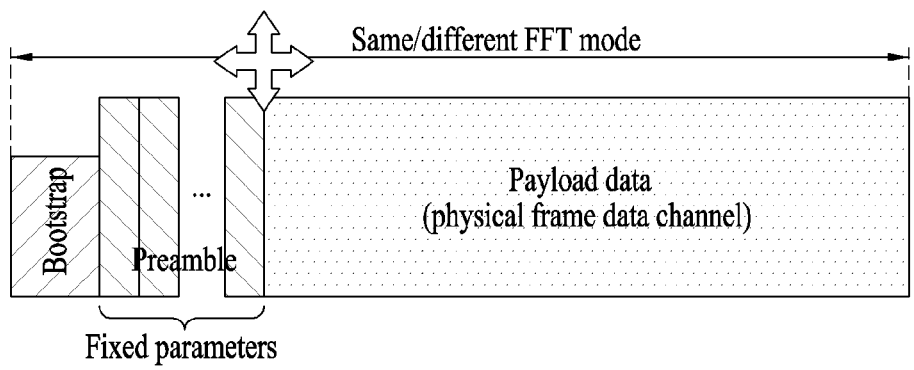
FIG. 48 shows the preamble symbols according to one embodiment of the present invention.

FIG. 48 shows the preamble symbols according to one embodiment of the present invention.

The preamble symbols according to one embodiment may be composed of at least one OFDM symbol according to the number of bits of the L1 signaling information to be transmitted. The L1 signaling information to be transmitted through the preamble symbols may be mapped to the active carrier of the OFDM symbol, and may then be frequency-interleaved. In this case, the input data of the frequency interleaver may be used as the preamble cells corresponding to the OFDM symbol.

The parameters of the preamble symbols may have an arbitrary fixed value differently from the data symbols.

Therefore, the broadcast signal reception apparatus according to one embodiment may process the preamble symbols without obtaining signaling information of the preamble from the bootstrap, and may quickly recognize L1 signaling information transmitted from the preamble symbols, such that it can reduce the service acquisition time including the channel scanning time. In addition, the broadcast signal reception apparatus can minimize the possibility of FFI/GI acquisition failure even in the poor channel environment, resulting in an increased broadcast signal reception performance.

Parameters of the preamble symbols and the precondition for using the parameters according to one embodiment are as follows.

First of all, in order to increase flexibility in management of the broadcast signal system, the smallest FFT mode (e.g., 8K mode) may be applied to the preamble symbols. In addition, in order to allow the receiver to detect preamble symbols without signaling based on the bootstrap, NoA of the preamble symbols may be fixed. In addition, the number of preamble symbols may be determined in consideration of the relationship between the FFT mode of the preamble symbols and the FFT mode of the data symbols.

If the FFT mode of the preamble symbols is different from the FFT mode of the data symbols, the number of the preamble symbols may be limited to an even number, such that the broadcast signal reception apparatus can successively perform deinterleaving of the data symbols using the single memory during the above-mentioned frequency deinterleaving.

If the FFT mode of the preamble symbols is identical to the FFT mode of the data symbols, the number of the preamble symbols is not limited thereto. That is, the odd or even preamble sequences may be used irrespective of the data symbols.

Figure 49:
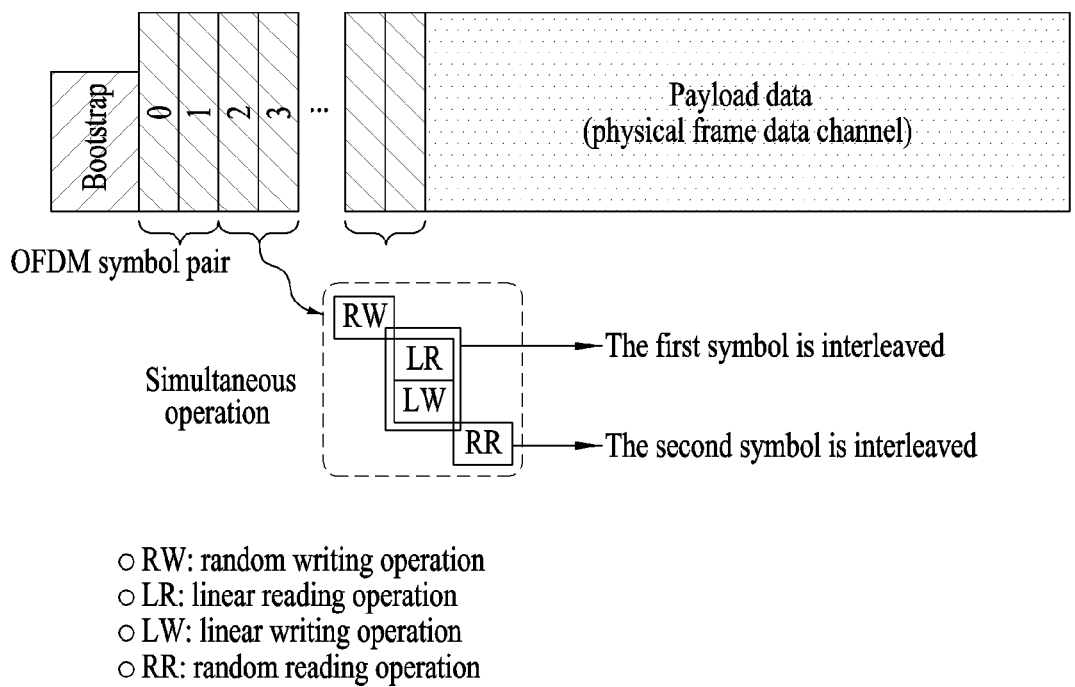
FIG. 49 is a conceptual diagram illustrating the frequency interleaving process for the preamble symbols according to one embodiment of the present invention.

FIG. 49 is a conceptual diagram illustrating the frequency interleaving process for the preamble symbols according to one embodiment of the present invention.

In more detail, FIG. 49 is a conceptual diagram illustrating the frequency interleaving process applied to the preamble cells corresponding to the preamble symbols for use in the case in which the FFT mode of the preamble symbols is different from the FFT mode of the data symbols.

In this case, the number of preamble symbols may be an even number as shown in FIG. 48. The frequency interleaver may use the preamble cells corresponding to the OFDM symbol pair including two contiguous symbols, as one group, and then perform the frequency interleaving.

As shown in the lower part of FIG. 49, the frequency interleaver according to one embodiment may write data in the memory by applying the interleaving sequence to the preamble cells corresponding to the even symbol of the OFDM symbol pair, and may read data from the memory by applying the interleaving sequence to the preamble cells corresponding to the odd symbol of the OFDM symbol pair. In addition, the read and write (R/W) operations of the frequency interleaver according to one embodiment may be successively carried out in the input preamble cells, and may be simultaneously carried out therein.

That is, if the frequency interleaver according to the embodiment randomly writes the preamble cells corresponding to the even symbol (first symbol) in the memory, and then inputs the preamble cells corresponding to the odd symbol (second symbol), the preamble cells corresponding to the written even symbol are linearly read from the memory, and the preamble cells corresponding to the odd symbol can be linearly written in the memory. Thereafter, the preamble cells corresponding to the odd symbol written in the memory may be randomly read.

In conclusion, the broadcast signal reception apparatus or the frequency deinterleaver contained in the broadcast signal reception apparatus according to one embodiment may perform the frequency deinterleaving using the single memory. The above-mentioned operation is identical to the frequency interleaving regarding the data symbols.

Figure 50:
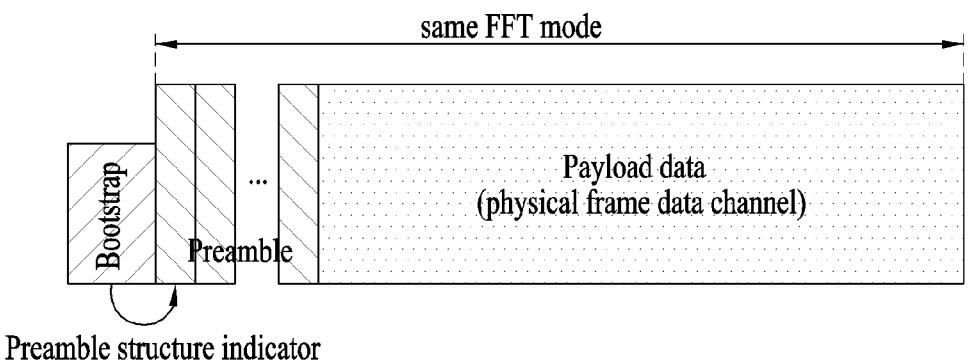
FIG. 50 is a conceptual diagram illustrating the frequency interleaving process for the preamble symbols according to another embodiment of the present invention.

FIG. 50 is a conceptual diagram illustrating the frequency interleaving process for the preamble symbols according to another embodiment of the present invention.

In more detail, FIG. 50 is a conceptual diagram of the frequency interleaving process applied to the preamble cells corresponding to the preamble symbols for use in the case in which the FFT mode of the preamble symbols is identical to the FFT mode of the data symbols.

In this case, the preamble symbol may use the same parameters (FFT/GI/NoA) as in the data symbols. It is assumed that the broadcast signal reception apparatus obtains information regarding not only the parameter information of the preamble symbol and but also the number of preambles from the bootstrap (preamble structure indicator information). In addition, the number of preamble symbols may be denoted by an even number or an odd number as shown in FIG. 48.

FIG. 50 is a conceptual diagram illustrating the frequency interleaving process for use in the case in which the number of preamble symbols is an even number. Therefore, the frequency interleaver according to one embodiment may use the preamble cells corresponding to the OFDM symbol pair including two contiguous symbols, as one group, and then perform the frequency interleaving. A detailed description thereof is identical to those of FIG. 49, and as such a detailed description thereof will herein be omitted.

Figure 51:
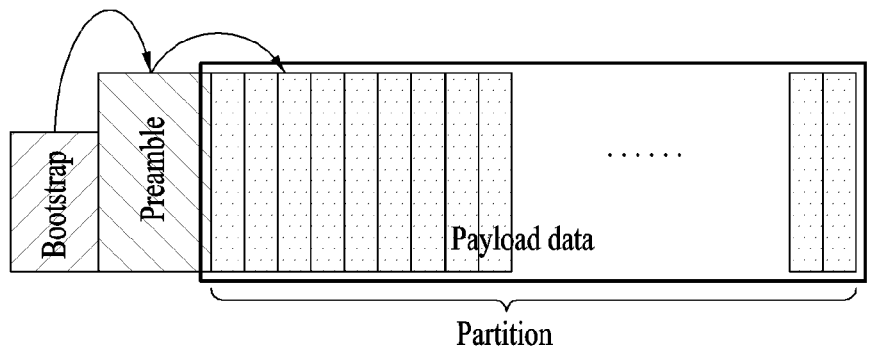
FIG. 51 is a conceptual diagram illustrating the signaling structure for use in the logical structure of the signal frame according to one embodiment of the present invention.

FIG. 51 is a conceptual diagram illustrating the signaling structure for use in the logical structure of the signal frame according to one embodiment of the present invention.

FIG. 51 shows not only the signaling information/content transmitted in the order of bootstrap, preamble symbol, data symbol requested for the frequency interleaving and the frequency deinterleaving, but also the entire operation mechanism. If the FFT modes applied to the data symbols are different from each other, the set (or aggregate) of the data symbols processed in the same FFT mode may be referred to as a partition.

The signal frame according to one embodiment may include at least one partition, and the partition may be referred to as a subframe. The above-mentioned operation may be changed according to designer's intention.

FIG. 51 is a logical structure of the signal frame including both the case in which the same FFT mode is applied to data symbols and the other case in which different FFT modes are applied to data symbols.

The bootstrap according to one embodiment may transmit information needed when the broadcast signal reception apparatus obtains the preamble symbol. In more detail, the bootstrap according to one embodiment may transmit FFT mode information of the preamble symbol, NoA of the preamble symbols, information regarding the number of preamble symbols, etc.

The preamble symbols according to one embodiment may transmit specific information needed for the broadcast signal reception apparatus to detect the data symbols. In more detail, the preamble symbols according to one embodiment may include information regarding the number of partitions, information regarding the FFT mode for each partition, NoA of data symbols contained in each partition, the number of data symbols for each partition, start symbol (or cell) information of each partition, the same FFT indicator information indicating where the same FFT mode is in the signal frame (or when the same FFT mode appears in the signal frame). The above-mentioned information may be dynamically changed per signal frame.

FIG. 52 is the payload data structure of the signal frame according to one embodiment of the present invention.

Figure 52A:
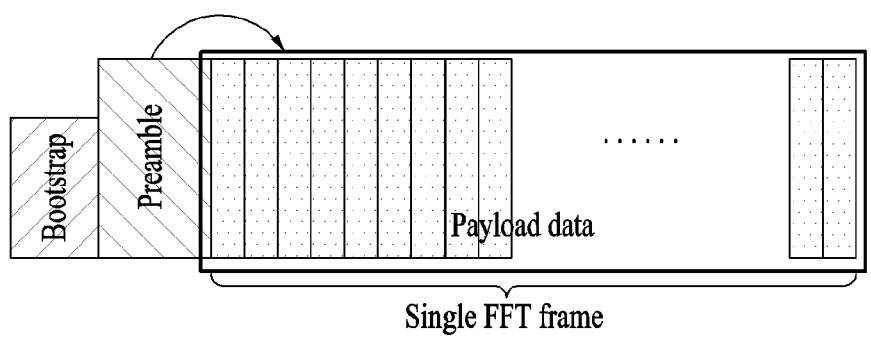
FIGS. 52A-52B illustrate the payload data structure of the signal frame according to one embodiment of the present invention.
Figure 52B:
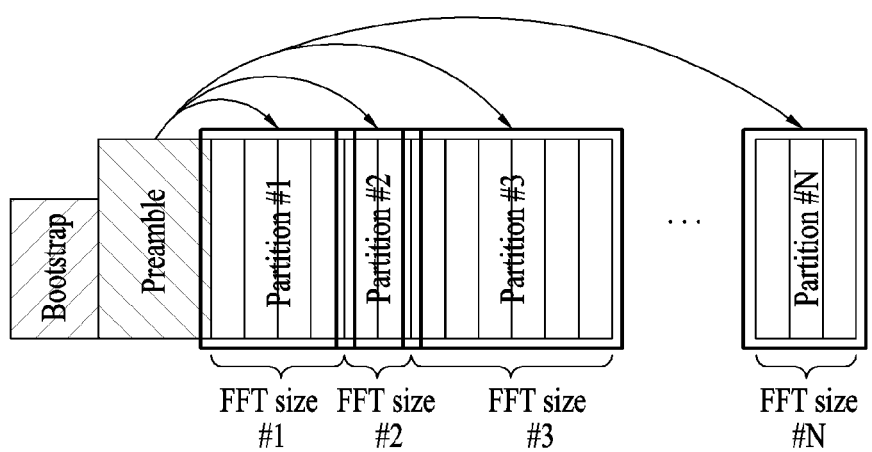

FIG. 52(a) shows the payload data structure for use in the case in which the same FFT mode is applied to payload data (i.e., data symbols). FIG. 52(b) shows the payload data structure for use in the case in which various FFT modes are applied to data symbols.

In the embodiments of the present invention, the signal frame shown in FIG. 52(a) may be referred to as the single FFT signal frame, and the signal frame shown in FIG. 52(b) may be referred to as the mixed FFT signal frame. The above-mentioned operation may be changed according to designer's intention.

In FIG. 52(a), the data symbols contained in one signal frame may have the same OFDM symbol structure, and may have the same parameters (FFT mode, GI length, NoA, pilot pattern, etc.). As described above, the parameters regarding the data symbols may be transmitted through the preamble symbols.

If the frequency interleaver according to one embodiment operates in the data cells corresponding to the OFDM symbol pair, it is necessary for the number of data symbols to be set to an even number. Therefore, the number of data symbols may be defined as follows according to the relationship between the FFT mode of the preamble symbols and the other FFT mode of the data symbols.

If the FFT mode of the preamble symbols is different from the FFT mode of the data symbols, the number of data symbols must be denoted by the even number.

If the FFT mode of the preamble symbols is identical to the FFT mode of the data symbols, the sum of the number of preamble symbols and the number of data symbols must be set to an even number. In conclusion, the number of data symbols may be set to an even number or an odd number according to the number of preamble symbols.

FIG. 52(b) illustrates a plurality of OFDM symbol structures contained in each data symbol of the single signal frame, wherein the OFDM symbol structures may have different parameters (FFT mode, GI length, NoA, pilot pattern, etc.) according to the symbol structure. The set (or aggregate) of data symbols having the same OFDM structure in th mixed FFT frame may be defined as the partition, such that the single mixed FFT mode may include a plurality of partitions.

Therefore, the independent parameters (FFT mode, GI length, NoA, pilot pattern, etc.) may be established in respective partitions as shown in FIG. 52, and the preamble symbols may include information regarding the position and structure of the respective partitions, information regarding the number of data symbols, etc. In addition, partitions having various FFT modes may be transmitted through the TDM (Time Division Multiplexing)-, LDM (Layered Division Multiplexing)- or FDM (Frequency Division Multiplexing) signal frames, and the partitions of the respective FFT modes may be defined as the set of OFDM symbols having a specific GI.

Different FFT modes may be defined to process broadcast services appropriate for various broadcast signal reception apparatuses (e.g., mobile broadcast signal reception apparatus, fixed broadcast signal reception apparatus, etc.). Therefore, if the target broadcast service for each FFT mode or the target broadcast signal reception device for each FFT mode is decided, the broadcast signal reception apparatus has only to obtain/process the section (partition) in which the broadcast service appropriate for the apparatus is transmitted, resulting in an increased power saving effect of the receiver.

The frequency deinterleaving of the broadcast signal reception apparatus according to one embodiment of the present invention may be operated as follows according to the relationship between the number of data symbols of each partition and the number of preamble symbols according to a first case in which the FFT mode of the preamble symbols is identical to the FFT mode of the data symbols and a second case in which the FFT mode of the preamble symbols is different from the FFT mode of the data symbols.

If the FFT mode of the preamble symbols is identical to the FFT mode of the data symbol of the first partition, and if the number of preamble symbols is an even number and the number of data symbols of each partition is an even number, the following operations can be carried out.

The broadcast signal reception apparatus may successively perform deinterleaving of the preamble symbols (having a maximum value of 32K) and the data symbols using the single memory. Specifically, the broadcast signal reception apparatus may perform deinterleaving using the single memory even when respective partitions have different FFT modes, such that the memory can be efficiently operated.

If the FFT mode of the preamble symbols is identical to the FFT mode of the data symbol of the first partition, and if the number of preamble symbols is an odd number and the number of data symbols of each partition is an even or odd number, the following operations can be carried out.

In this case, the broadcast signal reception apparatus may successively perform deinterleaving of the partitions corresponding to different FFT modes using the single memory. Therefore, since the broadcast signal reception apparatus performs deinterleaving of the preamble symbols and the data symbols using the double memories, memory efficiency may be deteriorated.

If the FFT mode of the preamble symbols is different from the FFT mode of the data symbols of the first partition, and if the number of preamble symbols is an even number and the number of data symbols for each partition is an even number, the following operations can be carried out.

The broadcast signal reception apparatus may successively perform deinterleaving of the preamble symbols (having a maximum value of 32K) and the data symbols using the single memory. Specifically, the broadcast signal reception apparatus may perform deinterleaving using the single memory even when respective partitions have different FFT modes, such that the memory can be efficiently operated.

If the FFT mode of the preamble symbols is different from the FFT mode of the data symbols of the first partition, and if the number of preamble symbols is an odd number and the number of data symbols for each partition is an even or odd number, the following operations can be carried out.

In this case, the broadcast signal reception apparatus may successively perform deinterleaving of the partitions corresponding to different FFT modes using the single memory. Therefore, since the broadcast signal reception apparatus performs deinterleaving of the preamble symbols and the data symbols using the double memories, memory efficiency may be deteriorated.

Therefore, in order to allow the broadcast signal reception apparatus to perform efficient frequency deinterleaving using the single memory, the FFT mode of the preamble symbol must be identical to the FFT mode of the first partition. In addition, in order to allow the broadcast signal reception apparatus to perform successive frequency deinterleaving even when respective partitions have different FFT modes, the number of data symbols contained in each partition may have the following conditions.

The sum of the number of preamble symbols and the number of data symbols contained in the first partition must be set to an even number. In addition, the number of data symbols contained in the remaining partitions may be set to an even number.

FIG. 53 is a conceptual diagram illustrating a method for processing signal frames of the single FFT mode by the broadcast signal reception apparatus according to one embodiment of the present invention.

Figure 53A:
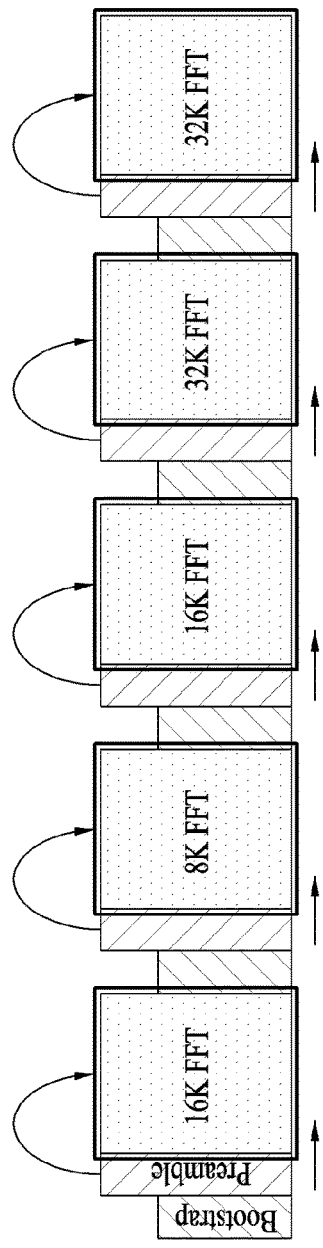
FIGS. 53A-53B present a conceptual diagram illustrating a method for processing signal frames of the single FFT mode by the broadcast signal reception apparatus according to one embodiment of the present invention.
Figure 53B:
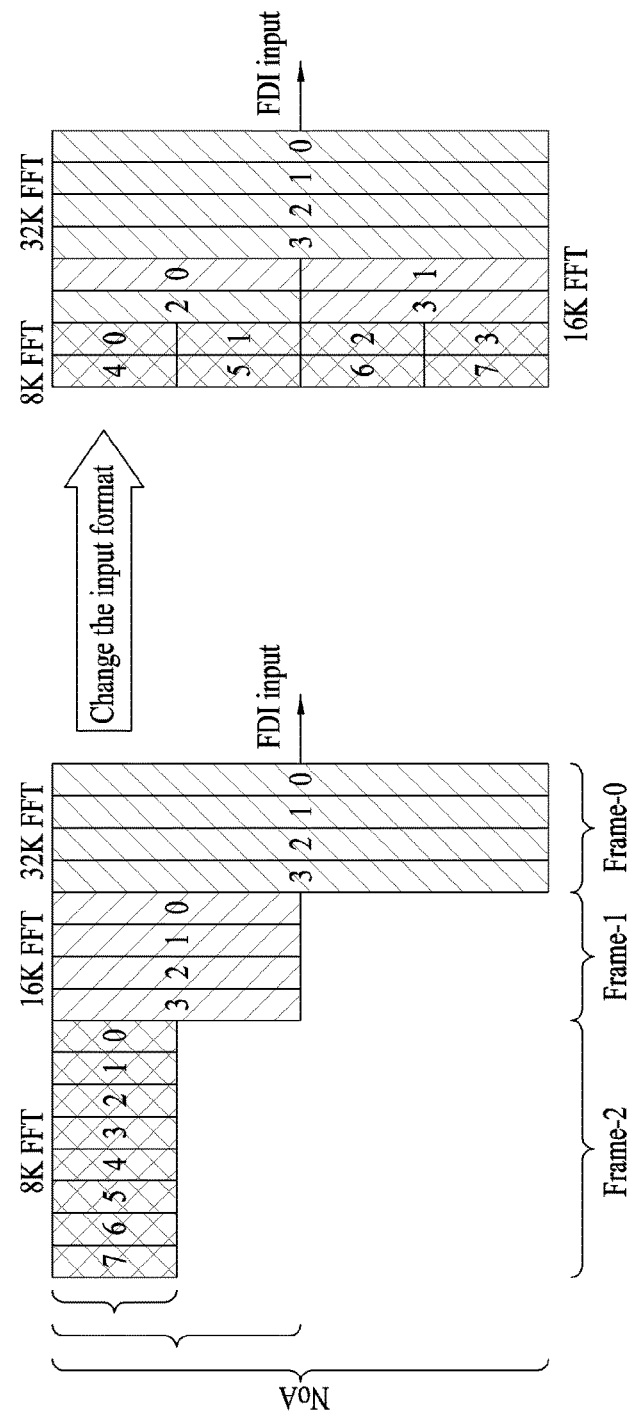

FIG. 53(a) is a conceptual diagram illustrating a method for processing single FFT mode signal frames of different FFT modes successively input to the broadcast signal reception apparatus. FIG. 53(b) is a conceptual diagram illustrating a method for processing the single FFT mode signal frames successively input to the broadcast signal reception apparatus, prior to execution of the frequency deinterleaving.

In more detail, as can be seen from FIG. 53(a), in the case of the single FFT mode signal frame, the preamble symbol contained in one signal frame and the data symbol contained in the same signal frame may have the same FFT mode, and FFT modes of the respective signal frames may be different from each other. In FIG. 53, the first signal frame may indicate the embodiment of the 16K FFT mode, the second signal frame may indicate the embodiment of the 8K FFT mode, the third signal frame may indicate the embodiment of the 16K FFT mode, and the fourth and fifth signal frames may indicate the embodiments of the 32K FFT mode. In addition, the sum of the number of preamble symbols contained in each signal frame and the number of data symbols adjacent to the preamble symbols may be denoted by an even number, and each signal frame may include one partition.

Each signal frame may include a bootstrap, at least one preamble symbol, and data symbols. Information transmitted through the bootstrap and the preamble symbol is identical to that of the above-mentioned description.

Therefore, the broadcast signal reception apparatus according to one embodiment may decode the preamble symbols using the bootstrap information, and may decode data symbols using the information transmitted through the preamble symbols.

As can be seen from FIG. 53(b), the broadcast signal reception apparatus according to one embodiment may perform frequency deinterleaving for the received signal frames shown in FIG. 53(a). The broadcast signal reception apparatus according to one embodiment may perform frequency deinterleaving using the bootstrap and information contained in the preamble symbol. In this case, a maximum reception memory capacity may be 32K. In addition, the broadcast signal reception apparatus according to one embodiment may simultaneously perform the read and write (R/W) operations of input data corresponding to each OFDM symbol. The broadcast signal reception apparatus may perform successive frequency deinterleaving of signal frames having different FFT modes using the single memory.

Therefore, assuming that the broadcast signal reception apparatus according to one embodiment successively receives the signal frame #0 of the 32K FFT mode, the signal frame #1 of the 16K FFT mode, and the signal frame #2 of the 8K FFT mode as shown in FIG. 53(b), the broadcast signal reception apparatus may virtually change the input format of the frequency deinterleaver so as to efficiently perform frequency deinterleaving using the 32K single memory. FIG. 53(b) is a conceptual diagram illustrating a method for changing the input format using the method for rearranging the position of data symbols contained in each signal frame in response to NoA of the 32K FFT mode. In this case, the input format may be changed according to designer's intention or the reception apparatus implementation method.

Therefore, assuming that the input format of the frequency deinterleaver is changed as shown in FIG. 53(b), the frequency deinterleaver may perform frequency deinterleaving using the single memory, irrespective of NoA of the signal frames having different FFT modes.

FIG. 54 is a conceptual diagram illustrating the method for processing signal frames of the single FFT mode by the broadcast signal reception apparatus according to another embodiment of the present invention.

FIG. 54 shows another embodiment of FIG. 53. In more detail, FIG. 54 illustrates the case in which frequency deinterleaving is performed only in one FFT mode signal frame using the single memory.

FIG. 54(a) is a conceptual diagram illustrating a method for allowing the broadcast signal transmission apparatus to detect and process only the 16K FFT mode signal frame from among single FFT mode signal frames being successively received. FIG. 54(b) is a conceptual diagram illustrating a method for allowing the broadcast signal reception apparatus to selectively perform frequency deinterleaving of only the 32K FFT mode signal frame from among the single FFT mode signal frames being successively received.

As can be seen from FIG. 54(a), the broadcast signal reception apparatus according to one embodiment of the present invention may selectively decode only the 16K FFT mode signal frames. In FIG. 54(a), the sum of the number of preamble symbols contained in each signal frame and the number of data symbols adjacent to the preamble symbols is denoted by an even number, and each signal frame may include one partition. In addition, the broadcast signal reception apparatus according to one embodiment of the present invention may detect signal frames of the same FFT mode using the same FFT indicator information transmitted through the preamble symbols.

In addition, as can be seen from FIG. 54(b), the broadcast signal reception apparatus according to one embodiment of the present invention may perform frequency deinterleaving of only the 32K mode signal frames using a maximum of 32K-sized single memory.

In more detail, as shown in FIG. 54(b), assuming that the broadcast signal reception apparatus according to one embodiment successively receives the signal frame #0 of the 32K FFT mode, the signal frame #1 of the 16K FFT mode, the signal frame #2 of the 8K FFT mode, and the signal frame #4 of the 32K FFT mode, the broadcast signal reception apparatus may detect the signal frames #0 and #4 of the 32K FFT mode, and may perform frequency deinterleaving.

FIG. 54(b) is a conceptual diagram illustrating the method for changing the input format of the frequency deinterleaver by detecting only the 32K mode signal frames. Therefore, assuming that the input format of the frequency deinterleaver is changed as shown in the right block of FIG. 54(b), the frequency deinterleaver may perform frequency deinterleaving of only the 32K FFT mode signal frames using the single memory.

FIG. 55 is a conceptual diagram illustrating a method for processing signal frames of the mixed FFT mode by the broadcast signal reception apparatus according to one embodiment of the present invention.

Figure 55A:
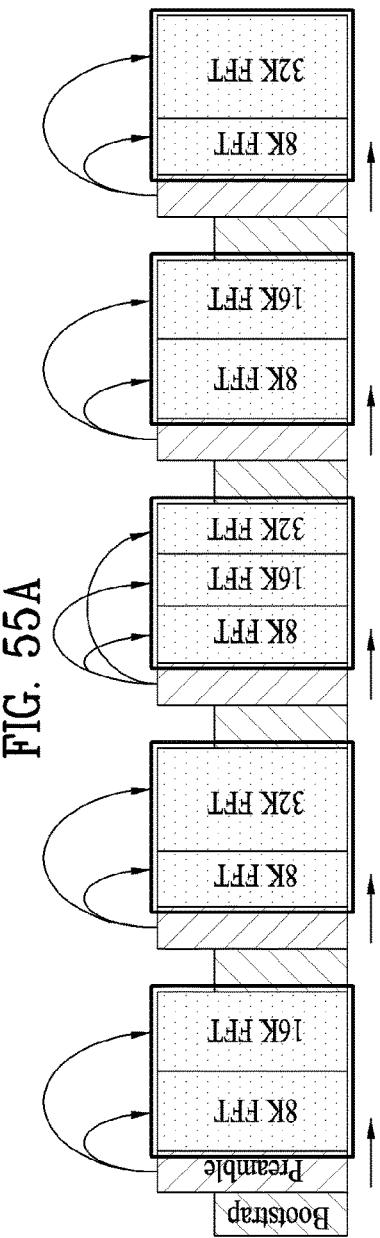
FIGS. 55A-55B present a conceptual diagram illustrating a method for processing signal frames of the mixed FFT mode by the broadcast signal reception apparatus according to one embodiment of the present invention.
Figure 55B:
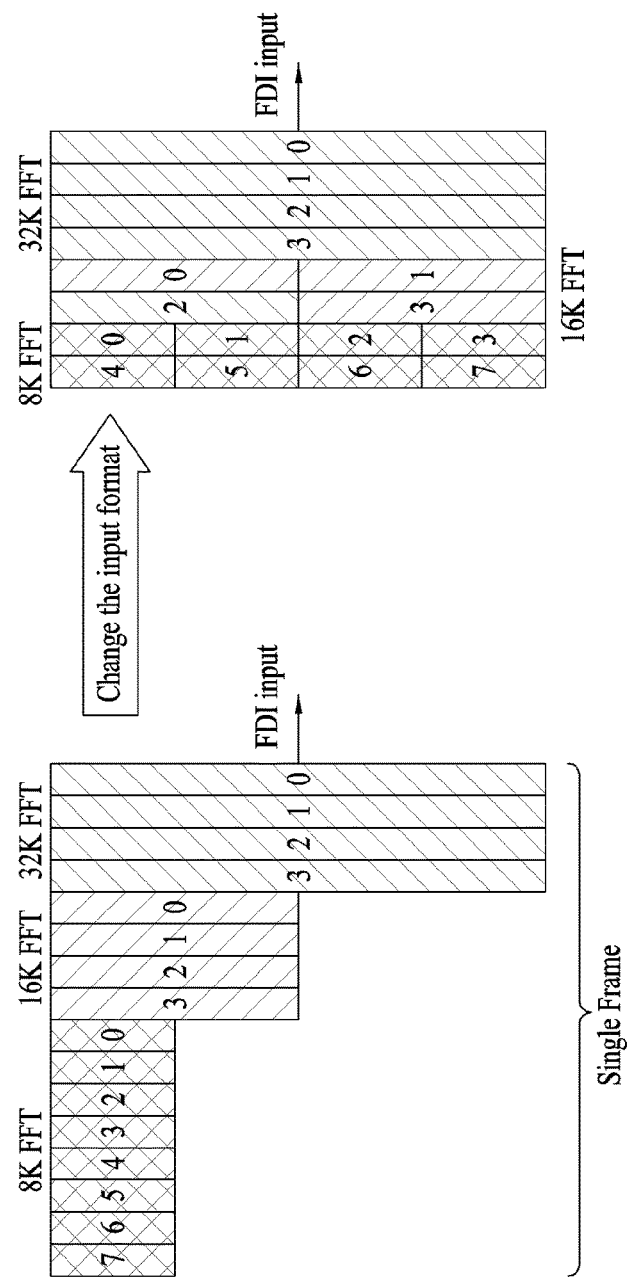

FIG. 55(a) is a conceptual diagram illustrating a method for allowing the broadcast signal reception apparatus to process the mixed FFT mode signal frames having different FFT modes being successively received. FIG. 55(b) is a conceptual diagram illustrating a method for allowing the broadcast signal reception apparatus to process the successively received mixed FFT mode signal frames, prior to execution of the frequency deinterleaving.

In more detail, in the case of using the mixed FFT mode signal frame as shown in FIG. 55(a), the FFT mode of the preamble symbol contained in one signal frame is identical to the FFT mode of the first partition contained in one signal frame. The sum of the number of preamble symbols and the number of data symbols of a partition adjacent to the preamble symbols may be denoted by an even number. In addition, the number of data symbols contained in the remaining partitions may be denoted by an even number, and partitions having at least two different FFT modes may be contained in the mixed FFT mode signal frame.

In FIG. 55, the first signal frame may include partitions of the 8K and 16K FFT modes, the second signal frame may include partitions of the 8K and 32K FFT modes, the third signal frame may include partitions of the 8K, 16K, and 32K FFT modes, the fourth signal frame may include partitions of the 8K and 16K FFT modes, and the fifth signal frame may include partitions of the 8K and 32K FFT modes.

In addition, each signal frame may include a bootstrap, at least one preamble symbol, and data symbols. Information transmitted through the bootstrap and the preamble symbol may be identical to those of the above-mentioned description.

Therefore, the broadcast signal reception apparatus according to one embodiment may decode the preamble symbol using the bootstrap information, and may decode data symbols using information transmitted through the preamble symbols. Specifically, the broadcast signal reception apparatus according to one embodiment of the present invention may confirm not only the position of each partition contained in one signal frame but also the FFT mode, using the start symbol (or cell) information contained in the preamble symbol and per-partition FFT mode information.

As can be seen from FIG. 55(b), the broadcast signal reception apparatus according to one embodiment may perform frequency deinterleaving of the signal frames received in FIG. 55(a).

The broadcast signal reception apparatus according to one embodiment may perform frequency deinterleaving using the bootstrap and information contained in the preamble symbol. In this case, a maximum reception memory capacity may be 32K. In addition, the broadcast signal reception apparatus according to one embodiment may simultaneously perform the read and write (R/W) operations of input data corresponding to each OFDM symbol, and may successively perform frequency deinterleaving of data segments corresponding to at least two FFT modes contained in one signal frame using the single memory.

Therefore, assuming that the broadcast signal reception apparatus according to one embodiment receives the mixed FFT signal frame including the 32K FFT mode partition, the 16K FFT mode partition, and the 8K FFT mode partitions, the broadcast signal reception apparatus may virtually change the input format of the frequency deinterleaver so as to efficiently perform frequency deinterleaving using the 32K single memory. FIG. 55(b) is a conceptual diagram illustrating a method for changing the input format using the method for rearranging the position of data symbols contained in the partitions contained in the mixed FFT signal frame in response to NoA of the 32K FFT mode. In this case, the input format may be changed according to designer's intention or according to the reception apparatus implementation method.

Therefore, assuming that the input format of the frequency deinterleaver is changed as shown in the right block of FIG. 55(b), the frequency deinterleaver may perform frequency deinterleaving of the partitions having different FFT modes contained in the single mixed FFT signal frame, using the single memory.

FIG. 56 is a conceptual diagram illustrating a method for allowing the broadcast signal reception apparatus to process signal frames of the mixed FFT mode according to another embodiment of the present invention.

FIG. 56 shows another embodiment of FIG. 55. In more detail, FIG. 56 is a conceptual diagram illustrating the case in which the broadcast signal reception apparatus performs frequency deinterleaving only for a specific FFT mode partition using the single memory.

FIG. 56(a) is a conceptual diagram illustrating a method for allowing the broadcast signal reception apparatus to detect and process partitions of a specific FFT mode (i.e., 16K FFT mode) contained in the mixed FFT mode signal frames having different FFT modes being successively received. FIG. 56(b) is a conceptual diagram illustrating a method for allowing the broadcast signal reception apparatus to process the 32K FFT mode partitions contained in the successively received mixed FFT mode signal frames, prior to frequency-deinterleaving the 32K FFT mode partitions.

As can be seen from FIG. 56(a), the broadcast signal reception apparatus according to one embodiment may selectively decode only the 16K FFT mode partitions. The FFT mode of the preamble symbol contained in one signal frame may be identical to the FFT mode of the first partition contained in the same single frame. The sum of the number of preamble symbols and the number of data symbols of partitions adjacent to the preamble symbols may be denoted by an even number. In addition, the number of data symbols contained in the remaining partitions may be denoted by an even number, and partitions having at least two different FFT modes may be contained in the mixed FFT mode signal frame.

The broadcast signal reception apparatus according to one embodiment may decode the preamble symbol using the bootstrap information, and may decode data symbols using information transmitted through the preamble symbol. Specifically, the broadcast signal reception apparatus according to one embodiment may confirm not only the position of each partition contained in the current signal frame but also the FFT mode using both the start symbol (or cell) information of each partition contained in the preamble symbol and per-partition FFT mode information, and may process the partition of a desired FFT mode. The broadcast signal reception apparatus may detect the same FFT mode partitions transmitted through another signal frame using the same FFT indicator information.

As can be seen from FIG. 56(b), the broadcast signal reception apparatus according to one embodiment may perform frequency deinterleaving of only the 32K FFT mode partitions using a maximum of 32K-sized single memory.

In more detail, as shown in FIG. 56(b), assuming that the broadcast signal reception apparatus according to one embodiment successively receives the signal frame #0 including partitions of the 32K, 16K, and 8K FFT modes and the signal frame #1 including the 32K FFT mode partition and other FFT mode partitions, the broadcast signal reception apparatus may detect only the 32K FFT mode partitions within each signal frame, and may perform frequency deinterleaving.

FIG. 56(b) is a conceptual diagram illustrating a method for changing the input format of the frequency deinterleaver by detecting only the 32K FFT mode partitions. Therefore, assuming that the input format of the frequency deinterleaver is changed as shown in the right block of FIG. 56(b), the frequency deinterleaver may perform frequency deinterleaving of only the 32K FFT mode partitions using the single memory.

The signal frame structure of the broadcast signal transmission/reception (Tx/Rx) apparatuses of the next generation broadcast service and the frequency interleaver according to one embodiment of the present invention will hereinafter be described.

As described above, the frame building block according to one embodiment may receive data processed through an independent physical path (referred to as DP or PLP or to as Physical Layer Pipe), and may output a plurality of frame symbols. Thereafter, the constituent symbols of the frame may be converted into time-domain OFDM symbols in the OFDM generation block, and then transmitted.

The signal frame according to one embodiment may include a bootstrap, a preamble (or a preamble symbol), and at least one subframe.

The bootstrap according to one embodiment may be located at the foremost position of the signal frame, may include at least one symbol, and may have a fixed 2K FFT size. The OFDM generation block according to one embodiment may insert the bootstrap into the foremost part of the signal frame after completion of IFFT execution and guard interval (GI) insertion.

In addition, the preamble according to one embodiment may include at least one symbol, and may be referred to as a preamble symbol. The preamble according to one embodiment may be located between the bootstrap and the first subframe, and the FFT size used in the preamble may be set to any one of 8K, 16K, and 32K. In addition, the FFT size used in the preamble may be identical to or different from the FFT size used in the first subframe.

At least one subframe according to one embodiment may be located behind the preamble. As described above, at least one subframe may be contained in payload of the signal frame, and one subframe may include at least one data symbol. The signal frame according to one embodiment may have the same or different sizes of at least one subframe, and the FFT size used in each subframe may be set to any one of 8K, 16K, and 32K.

In addition, application or non-application of the frequency interleaving may be changed per bootstrap, per preamble, or per subframe. In more detail, frequency interleaving is not applied to the bootstrap, and the frequency interleaving may always be applied to the preamble. In the case of the subframe, frequency interleaving may be applied to each subframe, or may not be applied thereto.

Signaling information indicating whether the frequency interleaving is applied to each subframe may be contained in L1 signaling information transmitted through the preamble. The signaling information indicating whether frequency interleaving is applied to each subframe may be defined as a flag indicating the on/off operations of the frequency interleaving. The above-mentioned operations may be changed according to designer's intention.

The frequency interleaver for use in the case in which the FFT size of the preamble is identical to or is different from the FFT size of the first subframe will hereinafter be described.

FIG. 57 is a conceptual diagram illustrating the operations of the frequency interleaver for use in the case in which the preamble and the first subframe have the same or different FFT sizes.

Figure 57A:
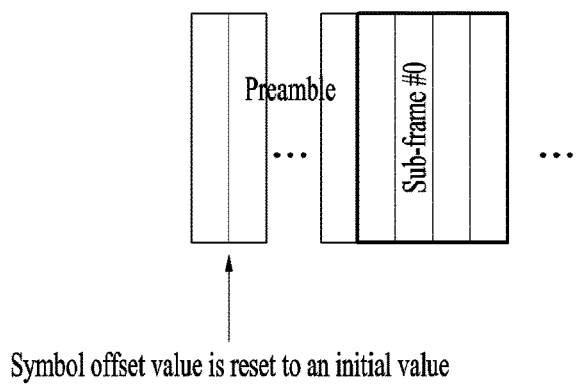
FIGS. 57A-57C present a conceptual diagram illustrating the operations of the frequency interleaver for use in the case in which the preamble and the first subframe have the same or different FFT sizes.

In FIG. 57(a), assuming that the preamble and the first subframe have the same FFT size and the frequency interleaving is applied to the first subframe #0, the frequency interleaver may reset the symbol offset value (or symbol offset) only in the start part (first preamble symbol) of the preamble. Although the present invention has disclosed that the symbol offset value is reset to zero (0) for convenience of description, it should be noted that the above-mentioned description may be changed according to designer's intention. In this case, one frequency interleaving based on the FFT size may be applied to the preamble and the first subframe, and the symbol offset value may be successively changed in the preamble and the first subframe.

Figure 57B:
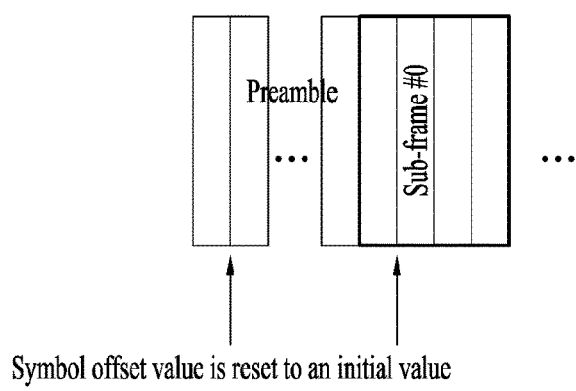

FIG. 57(b) is a conceptual diagram illustrating the case in which frequency interleaving is applied to the first subframe #0, irrespective of the FFT sizes of the preamble and the first subframe. In more detail, FIG. 57(b) shows the operation of the frequency interleaver configured to perform resetting of the symbol offset value not only at the start part (first preamble symbol) of the preamble, but also at the start part (the first data symbol or the first symbol) of the first subframe.

If the preamble and the first subframe have the same FFT size, different frequency interleaving methods may be applied to the preamble and the first subframe. Therefore, two frequency interleaving methods may be conceptually applied to the same FFT size.

Assuming that the preamble and the first subframe have different FFT sizes, frequency interleaving based on each FFT size may be applied to the preamble and the first subframe.

Figure 57C:
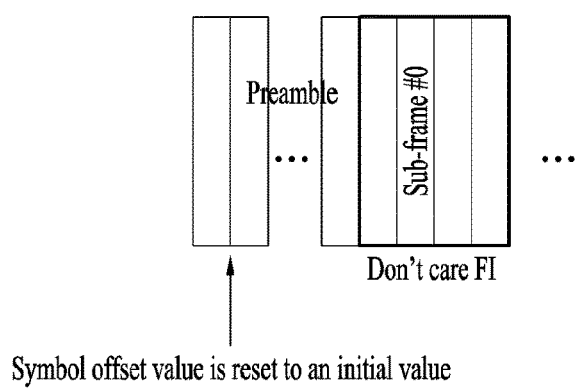

FIG. 57(c) is a conceptual diagram illustrating the case in which frequency interleaving is not applied to the first subframe #0, irrespective of the FFT size of the preamble and the first subframe. FIG. 57(c) shows the operation of the frequency interleaver configured to perform resetting of the symbol offset value only at the start part (first preamble symbol) of the preamble. As shown in FIG. 57, the frequency interleaver may be turned off at the first subframe.

The broadcast signal reception apparatus corresponding to the broadcast signal transmission apparatus according to one embodiment may perform frequency deinterleaving corresponding to the inverse process of the frequency interleaver.

If the symbol offset value is initialized at the preamble and the first subframe, the broadcast signal reception apparatus can perform frequency deinterleaving using the single memory. That is, there is no need to determine whether the preamble and the first subframe have the same or different FFT sizes, the same operation can be achieved irrespective of the FFT size, and unnecessary operations of the broadcast signal reception apparatus can be removed. The above-mentioned embodiments can be applied to borders of all subframes having different FFT sizes within the frame, and may also be changed according to designer's intention.

The frequency deinterelaver at the receiver side: The frequency deinterleaving operation follows to the inverse processing of the frequency interleaving operation at transmitter side in accordance with some embodiments. The address generator (or the interleaving address generator) used at the receiver side is same with the address generator (or the interleaving address generator) used at the transmitter side. The maximum memory requirement for a memory of the frequency deinterleaver is 32 K.

Figure 58:
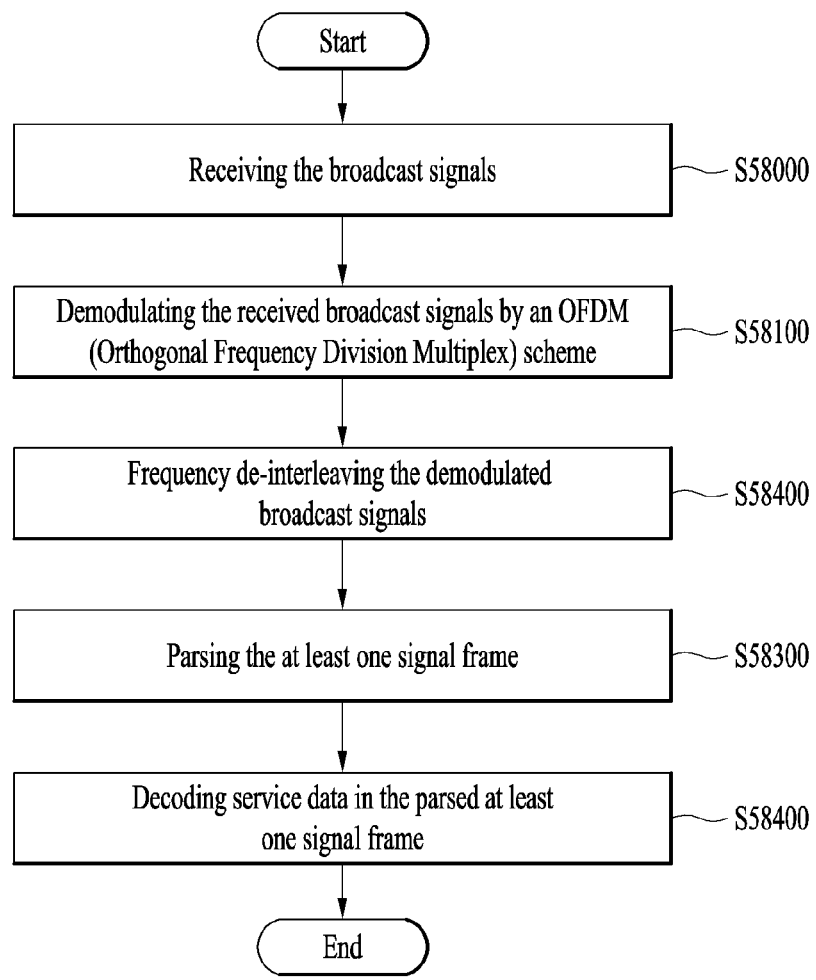
FIG. 58 is a flowchart illustrating a method for receiving broadcast signals according to an embodiment of the present invention.

FIG. 58 is a flowchart illustrating a method for receiving broadcast signals according to an embodiment of the present invention.

The apparatus for receiving broadcast signals according to an embodiment of the present invention may perform a reverse process of transmitting broadcast signals which is described in FIG. 1 to FIG. 8, FIG. 10 to FIG. 57.

The apparatus for receiving broadcast signals according to an embodiment of the present invention or a receiver can receive broadcast signals (S58000).

Then the apparatus for receiving broadcast signals according to an embodiment of the present invention or a synchronization & demodulation module in the apparatus for receiving broadcast signals can demodulate the received broadcast signals by an OFDM (Orthogonal Frequency Division Multiplexing) scheme (S58100). Details are as described in FIG. 9.

The apparatus for receiving broadcast signals according to an embodiment of the present invention or the frequency deinterleaver can frequency de-interleave the demodulated broadcast signals by using a interleaving sequence (S58200). In addition, the interleaving sequence may be used for data at least one of the preamble and a sub-frame and the interleaving sequence may be generated based on an interleaving sequence and a symbol offset. Moreover, a symbol offset value for the preamble may be reset to an initial value on a first symbol in the preamble and a symbol offset value for the sub-frame may be reset to an initial value on a first symbol in the sub-frame. The frequency deinterleaving is an inverse process described in FIG. 30 to FIG. 57.

Subsequently, the apparatus for receiving broadcast signals according to an embodiment of the present invention or the frame parsing module can parse at least one signal frame from the frequency deinterleaved broadcast signals (S58300). The detailed process of parsing is as described in FIG. 9.

Then, the apparatus for receiving broadcast signals according to an embodiment of the present invention or the demapping & decoding module can decode service data in the parsed at least one signal frame (S58400).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

A module, a unit or a block according to embodiments of the present invention is a processor/hardware executing a sequence of instructions stored in a memory (or storage unit). The steps or the methods in the above described embodiments can be operated in/by hardwares/processors. In addition, the method of the present invention may be implemented as a code that may be written on a processor readable recording medium and thus, read by the processors provided in the apparatus according to embodiments of the present invention.

What is claimed is:

1. A frequency deinterleaver, the frequency deinterleaver comprising:
    a deinterleaving sequence generator to generate a deinterleaving sequence that is used for frequency deinterleaving; and
    a memory for the frequency deinterleaving,
    wherein:
        the deinterleaving sequence is generated based on a main deinterleaving sequence and a symbol offset,
        the deinterleaving sequence is used for the frequency deinterleaving after checking that memory addresses of the deinterleaving sequence are valid addresses,
        the frequency deinterleaving is always applied to symbols of a preamble and optionally applied to symbols of one or more subframes based on signaling information in the preamble, the preamble and the one or more subframes are included in a signal frame,
        an FFT size for the preamble and a first ($1^{st}$) sub-frame among the one or more subframes following the preamble is 32 K and a sum of a number of symbols in the preamble and the first (1st) sub-frame is an even number,
        a deinterleaving sequence for 32K is used for a symbol pair of the preamble, and a value of the symbol offset is reset to an initial value on a first (1st) symbol of the preamble and a value of the symbol offset for symbols of the first (1st) sub-frame is not reset.

2. The frequency deinterleaver of claim 1, wherein the frequency deinterleaving is performed by
    writing data in a symbol on the memory; and
    reading out the written data.

3. A method for frequency deinterleaving, the method comprising:
    generating a deinterleaving sequence that is used for frequency deinterleaving,
        wherein the deinterleaving sequence is generated based on a main deinterleaving sequence and a symbol offset, and
        the deinterleaving sequence is used for the frequency deinterleaving after checking that memory addresses of the deinterleaving sequence are valid addresses; and
    performing the frequency deinterleaving on symbols of a preamble and optionally performing the frequency deinterleaving on symbols of one or more subframes based on signaling information in the preamble, the preamble and the one or more subframes are included in a signal frame,
        wherein an FFT size for the preamble and a first ($1^{st}$) sub-frame among the one or more subframes following the preamble is 32 K and a sum of a number of symbols in the preamble and the first (1st) sub-frame is an even number,
        a deinterleaving sequence for 32K is used for a symbol pair of the preamble, and
        a value of the symbol offset is reset to an initial value on a first (1st) symbol of the preamble and a value of the symbol offset for symbols of the first (1st) sub-frame is not reset.

4. The method of claim 3, wherein the frequency deinterleaving is performed by:
    writing data in a symbol on the memory; and
    reading out the written data.

5. A frequency interleaver, the frequency interleaver comprising:
    an interleaving sequence generator to generate an interleaving sequence that is used for frequency interleaving; and
    a memory for the frequency interleaving,
    wherein:
        the interleaving sequence is generated based on a main interleaving sequence and a symbol offset,
        the interleaving sequence is used for the frequency interleaving after checking that memory addresses of the interleaving sequence are valid addresses,
        the frequency interleaving is always applied to symbols of a preamble and optionally applied to symbols of one or more subframes based on signaling information in the preamble, the preamble and the one or more subframes are included in a signal frame,
        an FFT size for the preamble and a first ($1^{st}$) sub-frame among the one or more subframes following the preamble is 32 K and a sum of a number of symbols in the preamble and the first (1st) sub-frame is an even number,
        an interleaving sequence for 32K is used for a symbol pair of the preamble, and a value of the symbol offset is reset to an initial value on a first (1st) symbol of the preamble and a value of the symbol offset for symbols of the first (1st) sub-frame is not reset.

6. The frequency interleaver of claim 5, wherein the frequency interleaving is performed by:

writing data in a symbol on the memory; and
reading out the written data.

7. A method for frequency interleaving, the method comprising:
generating an interleaving sequence,
wherein the interleaving sequence is generated based on a main interleaving sequence and a symbol offset, and
the interleaving sequence is used for frequency interleaving a symbol after checking that memory addresses of the interleaving sequence are valid addresses; and
frequency interleaving symbols of a preamble and optionally frequency interleaving symbols of one or more subframes based on signaling information in the preamble, the preamble and the one or more subframes are included in a signal frame,
wherein an FFT size for the preamble and a first ($1^{st}$) sub-frame among the one or more subframes following the preamble is 32 K and a sum of a number of symbols in the preamble and the first (1st) sub-frame is an even number,
an interleaving sequence for 32K is used for a symbol pair of the preamble, and
a value of the symbol offset is reset to an initial value on a first (1st) symbol of the preamble and a value of the symbol offset for symbols of the first (1st) sub-frame is not reset.

8. The method of claim 7, wherein the frequency interleaving is performed by:
writing data in a symbol on the memory; and
reading out the written data.

* * * * *